Oct. 16, 1934.  B. M. SHIPLEY  1,977,094
CASH REGISTER
Filed Aug. 22, 1927    12 Sheets-Sheet 1
FIG. 1
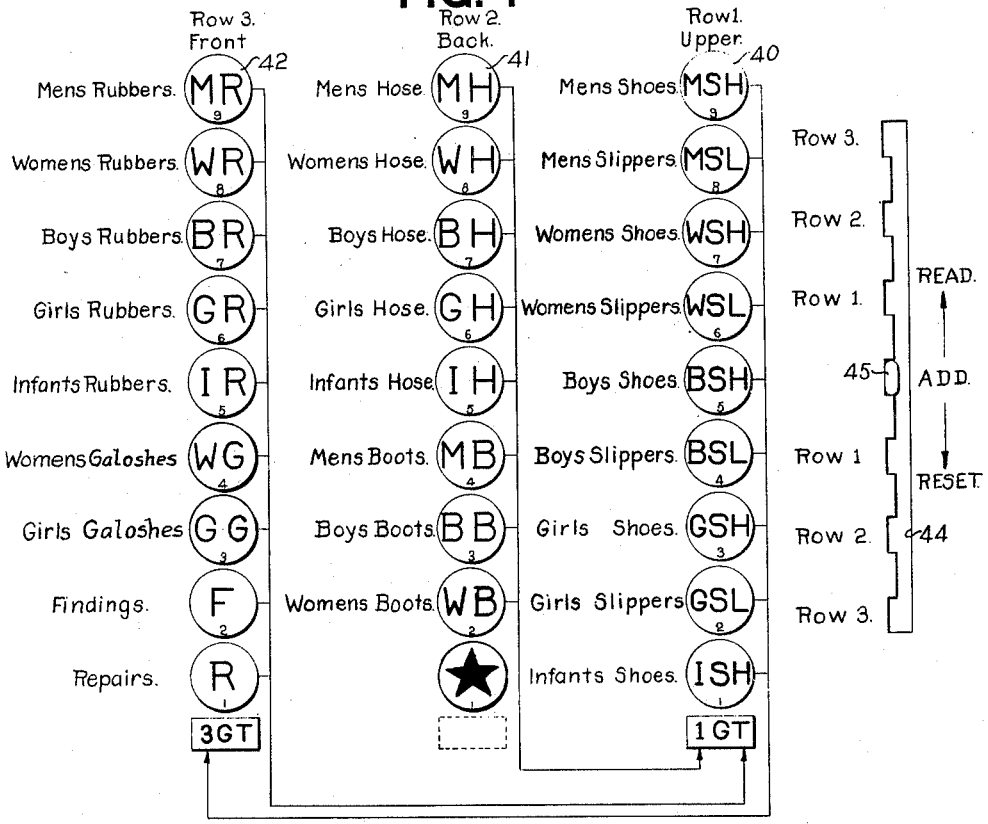
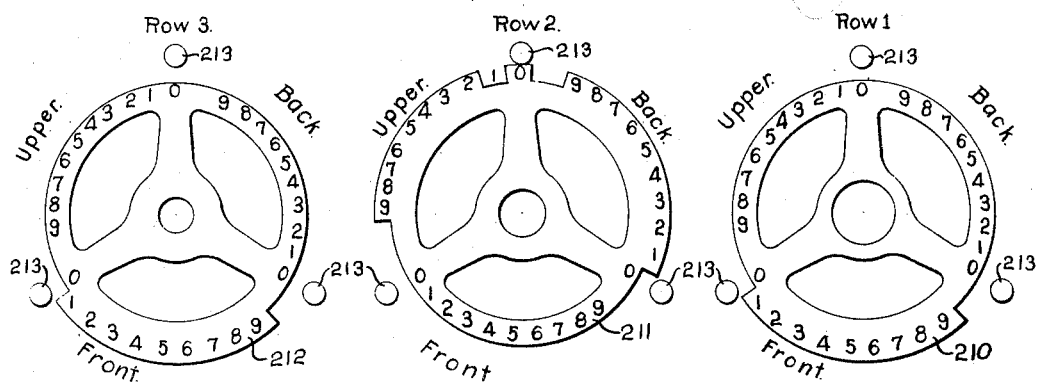
Inventor
Bernis M. Shipley
By Pearl Beust
Henry C. Stauffer
His Attorneys Oct. 16, 1934.    B. M. SHIPLEY    1,977,094
CASH REGISTER
Filed Aug. 22, 1927    12 Sheets-Sheet 3

Inventor
Bernis M. Shipley
By Pearl Beust
Henry E. Stauffer
His Attorneys

Oct. 16, 1934.  B. M. SHIPLEY  1,977,094
CASH REGISTER
Filed Aug. 22, 1927  12 Sheets-Sheet 6
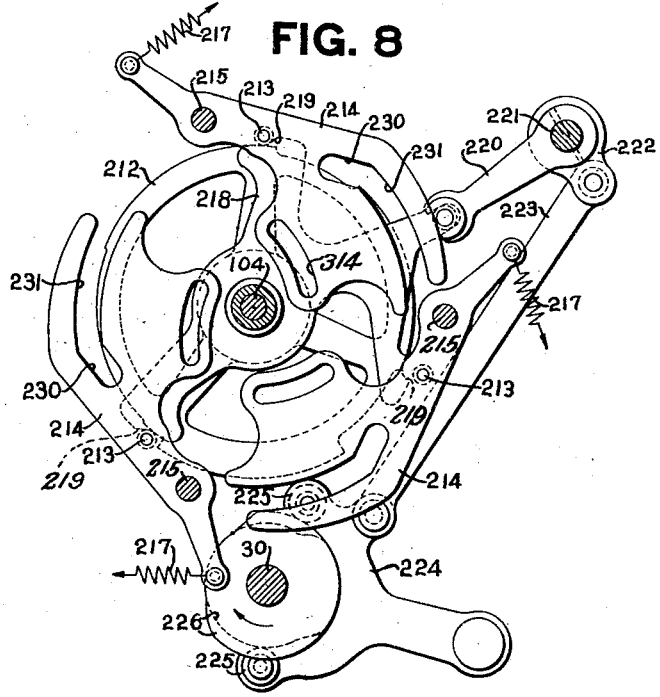
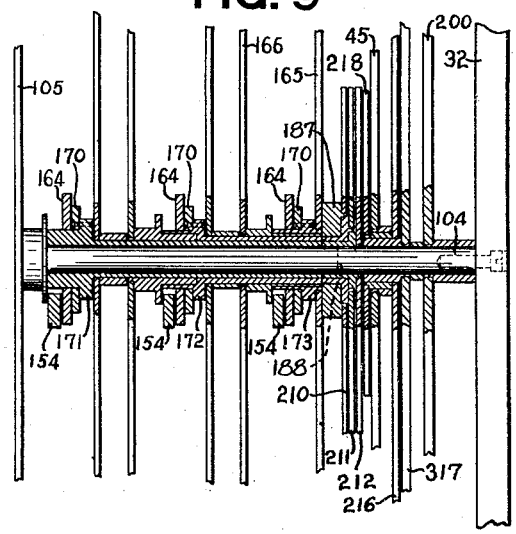
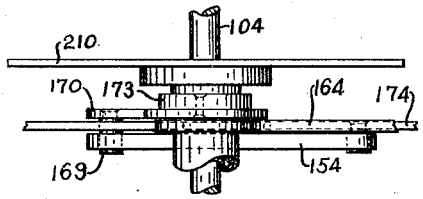
Inventor
Bernis M. Shipley
By Earl Beust
Henry C. Stauffer
His Attorneys Oct. 16, 1934.  B. M. SHIPLEY  1,977,094
CASH REGISTER
Filed Aug. 22, 1927          12 Sheets-Sheet 7

Inventor
Bernis M. Shipley
By
His Attorneys

Oct. 16, 1934.  B. M. SHIPLEY  1,977,094
CASH REGISTER
Filed Aug. 22, 1927   12 Sheets-Sheet 8

Inventor
Bernis M. Shipley
By Earl Beust
Henry Stauffer
His Attorneys

Oct. 16, 1934.  B. M. SHIPLEY  1,977,094
CASH REGISTER
Filed Aug. 22, 1927     12 Sheets-Sheet 9
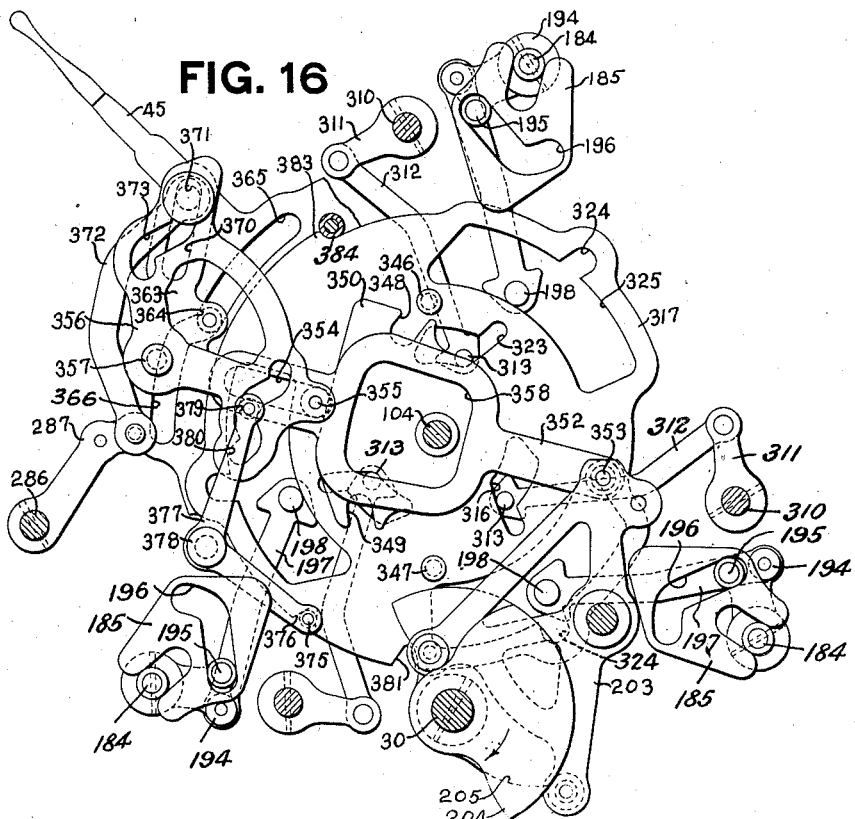
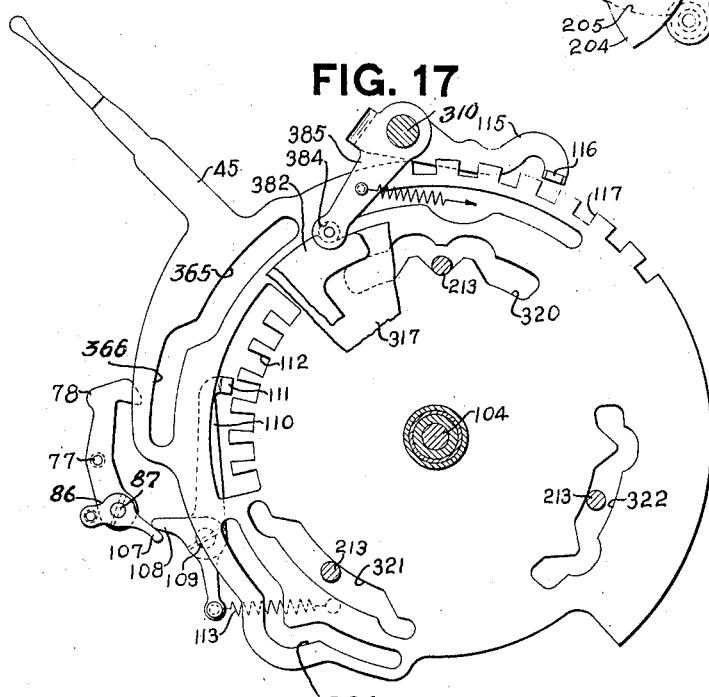
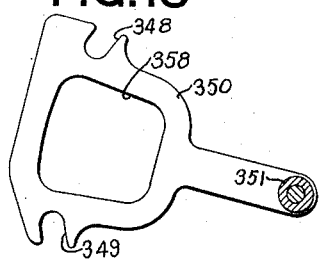
Inventor
Bernis M. Shipley
By Carl Beust
Henry E. Stauffer
His Attorneys Oct. 16, 1934.  B. M. SHIPLEY  1,977,094
CASH REGISTER
Filed Aug. 22, 1927  12 Sheets-Sheet 10
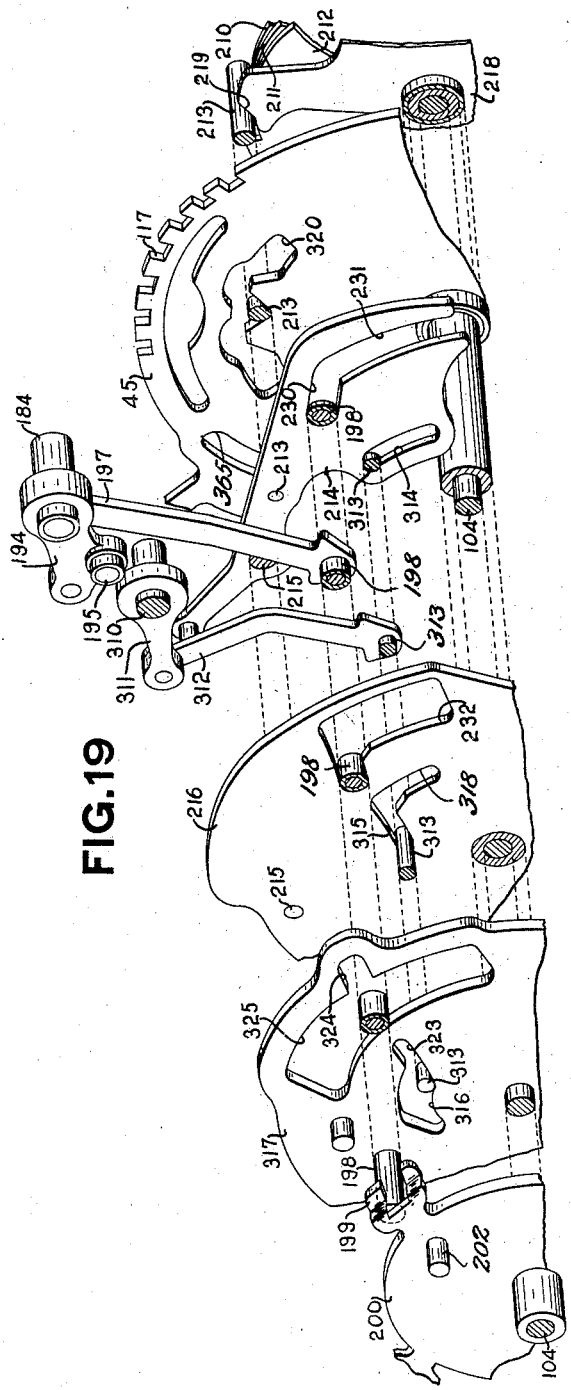
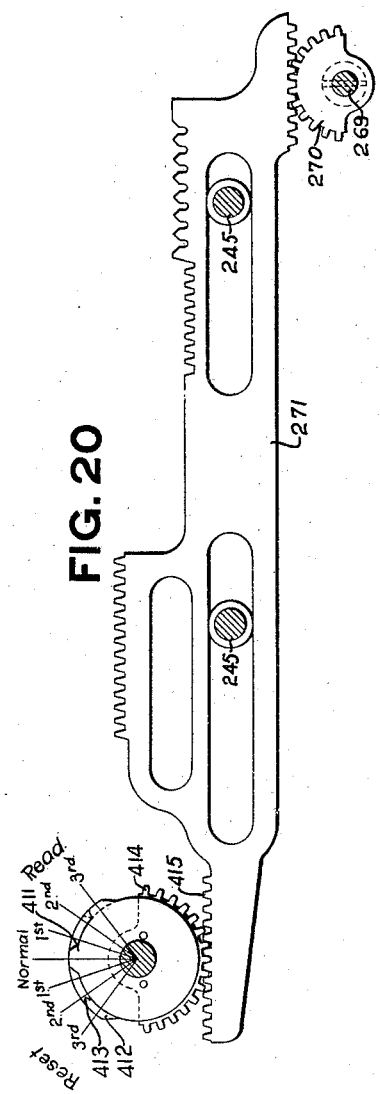
Inventor
Bernis M. Shipley
By Carl Beust
Harry E Stauffer
His Attorneys Oct. 16, 1934.   B. M. SHIPLEY   1,977,094

CASH REGISTER

Filed Aug. 22, 1927   12 Sheets-Sheet 11

Inventor
Bernis M. Shipley
By Carl Beust
Henry E. Stauffer
His Attorneys

Oct. 16, 1934.	B. M. SHIPLEY	1,977,094
CASH REGISTER
Filed Aug. 22, 1927       12 Sheets-Sheet 12

FIG. 23

| | | | | |
|---|---|---|---|---|
| 00001 | MSH | — | — | 23.00 |
| 00002 | WSH | — | — | 25.00 |
| 00003 | — | WH | — | 6.25 |
| 00004 | — | BB | — | 6.00 |
| 00005 | GSH | — | — | 4.00 |
| 00006 | — | — | WZ | 9.00 |
| 00007 | BSH | — | — | 16.50 |
| 00008 | — | — | BR | 3.00 |
| 00009 | — | BH | — | 2.25 |
| 00010 | — | MB | — | 12.00 |
| 00011 | — | — | F | 1.35 |
| 00012 | — | — | MR | 2.50 |
| 00013 | — | — | GG | 3.80 |
| 00014 | ISH | — | — | 2.00 |
| 00015 | GSL | — | — | 3.50 |
| 00016 | — | — | R | 1.60 |
| 00017 | MSH | — | — | 10.00 |
| 00017 | 3Z 1GT | — | 3GT | 84.00 — 420 |
| 00017 | 1Z 1GT | — | — | 131.75 — 421 |
| 00017 | 3Z 1GT | — | R | 1.60 ⎫ 422 |
| 00017 | 3Z 1GT | — | F | 1.35 ⎭ |
| 00017 | 1Z 1GT | — | — | 2.95 — 423 |
| 00017 | 3Z 1GT | — | WG | 9.00 ⎫ 424 |
| 00017 | 3Z 1GT | — | GG | 3.80 ⎭ |
| 00017 | 1Z 1GT | — | — | 12.80 — 425 |
| 00017 | 3Z 1GT | — | MR | 2.50 |
| 00017 | 3Z 1GT | — | WR | 0.00 |
| 00017 | 3Z 1GT | — | BR | 3.00 ⎫ 426 |
| 00017 | 3Z 1GT | — | GR | 0.00 |
| 00017 | 3Z 1GT | — | IR | 0.00 |
| 00017 | 1Z 1GT | — | — | 5.50 — 427 |
| 00017 | 2Z 1GT | MB | MR | 12.00 |
| 00017 | 2Z 1GT | BB | MR | 6.00 ⎫ 428 |
| 00017 | 2Z 1GT | WB | MR | 0.00 |
| 00017 | 2Z | — | ★ | 0.00 |
| 00017 | 1X 1GT | — | — | 18.00 — 429 |
| 00017 | 1Z MSH | WB | F | 33.00 |
| 00017 | 1Z WSH | WB | F | 25.00 |
| 00017 | 1Z BSH | WB | F | 16.50 ⎫ 430 |
| 00017 | 1Z GSH | WB | F | 4.00 |
| 00017 | 1Z ISH | WB | F | 2.00 |
| 00017 | 3Z 1GT | — | F | 80.50 — 431 |
| 00017 | 1Z MSL | WB | F | 0.00 |
| 00017 | 1Z WSL | WB | F | 0.00 ⎫ 432 |
| 00017 | 1Z BSL | WB | F | 0.00 |
| 00017 | 1Z GSL | WB | F | 3.50 |
| 00017 | 3Z 1GT | — | F | 3.50 — 433 |
| 00017 | 1Z 1GT | — | — | 102.00 — 434 |
| 00017 | 2Z 1GT | MH | MR | 0.00 |
| 00017 | 2Z 1GT | WH | MR | 6.25 |
| 00017 | 2Z 1GT | BH | MR | 2.25 ⎫ 435 |
| 00017 | 2Z 1GT | GH | MR | 0.00 |
| 00017 | 2Z 1GT | IH | MR | 0.00 |
| 00017 | 1X 1GT | — | — | 8.50 — 436 |
| 00017 | 2Z 1GT | WB | MR | 84.00 — 437 |
| 00017 | 1Z 1GT | — | — | 92.50 — 438 |
| 00017 | 3Z 1GT | — | MR | 110.50 — 439 |
| 00017 | 1Z 1GT | — | — | 110.50 — 440 |

FIG. 24

249 — [BSH-5, BSL-4, GSH-3, GSL-2, ISH-1, —0, 1GT, —, WSH-9, WSL-8, MSH-7, MSL-6]

Inventor
Bernis M. Shipley
By *Pearl Beust*
*Henry E. Stauffer*
His Attorneys

Patented Oct. 16, 1934

1,977,094

UNITED STATES PATENT OFFICE 1,977,094

CASH REGISTER

Bernis M. Shipley, Dayton, Ohio, assignor to The National Cash Register Company, Dayton, Ohio, a corporation of Maryland Application August 22, 1927, Serial No. 214,646

54 Claims. (Cl. 235—6)

This invention relates to cash registers and accounting machines, and more particularly to the type illustrated and described in Letters Patent of the United States No. 1,394,256, granted on October 18, 1921, to Frederick L. Fuller and in Letters Patent of the United States No. 1,619,796, granted on March 1, 1927 to Bernis M. Shipley.

The main object of this invention is to improve the general type of totalizer controlling mechanism illustrated and described in the above mentioned patents so that the owner of a machine may obtain a more detailed analysis of his business.

Therefore, in the accomplishment of the object of this invention certain portions of the above mentioned totalizer controlling mechanism have been redesigned, and now have combined therewith new mechanism constructed so as to cause, when desired, a total on one totalizer to be transferred therefrom into another totalizer, thus permitting the owner, if he chooses, to obtain in one totalizer the total of several totalizers, and at the same time permit him to obtain the total from each individual totalizer as that amount is transferred into another totalizer. In other words the individual totals may be printed and at the same time preserved in the machine, so that other totals may be added thereto.

Other objects of this invention are:

To provide novel mechanism controlled by the total lever for controlling the selecting of the groups of totalizers during clearing and total transfer operations.

To provide novel mechanism, intermediate the total lever and the main operating device, for engaging the totalizers so that they may be restored to zero.

To provide a novel device, intermediate the total lever and the main operating device, for engaging the totalizers at the proper time so that the amount which is cleared from the totalizer may be transferred into one or more totalizer or totalizers selected for such purpose.

To provide a novel connection between the main operating device and the totalizer engaging means.

To provide a novel device controlled by the total lever for rendering the above mentioned connection ineffective when the total lever is moved to certain positions.

To provide a novel construction, intermediate the main operating device and the totalizer engaging mechanism, for engaging the totalizers with the actuators during clearing operations.

To provide means for controlling the printing mechanism whereby characters may be printed to designate the totalizer from which the total is being transferred and also to designate the totalizer or totalizers into which the total is being transferred.

With these and incidental objects in view, the invention includes certain novel features of construction and combinations of parts, the essential elements of which are set forth in appended claims, and a preferred form or embodiment of which is hereinafter described with reference to the drawings which accompany and form part of this specification.

In said drawings:

Fig. 1 is a diagrammatic view of the control keys, total lever, and totalizer selecting plates.

Fig. 8 shows a portion of the totalizer line engaging selecting mechanism.

Fig. 9 is a front edge elevation showing the connections between the control differentials and the totalizer selecting plates.

Fig. 10 shows the connection between one of the differential beams and its associated selecting plate.

Fig. 16 shows particularly the resetting engaging plate and its connections with the total lever mechanism and the main operating mechanism.

Fig. 17 is a view of the total lever and the means for locking it against movement during any operation of the machine.

Fig. 18 is a view of one of the totalizer resetting engaging plate operating links.

Fig. 19 is a perspective view, spread apart, so that the mechanism may be more clearly shown, of the totalizer line engaging controlling mechanism.

Fig. 20 is a view of the rack and cooperating cams operated by the total lever to control the printing.

Fig. 23 shows a portion of a detail strip as printed by the mechanism described herein.

Fig. 24 is a diagramamtic view showing the relations of the characters on the type wheel 249 associated with the first row of keys.

*In general*

Figure 2:
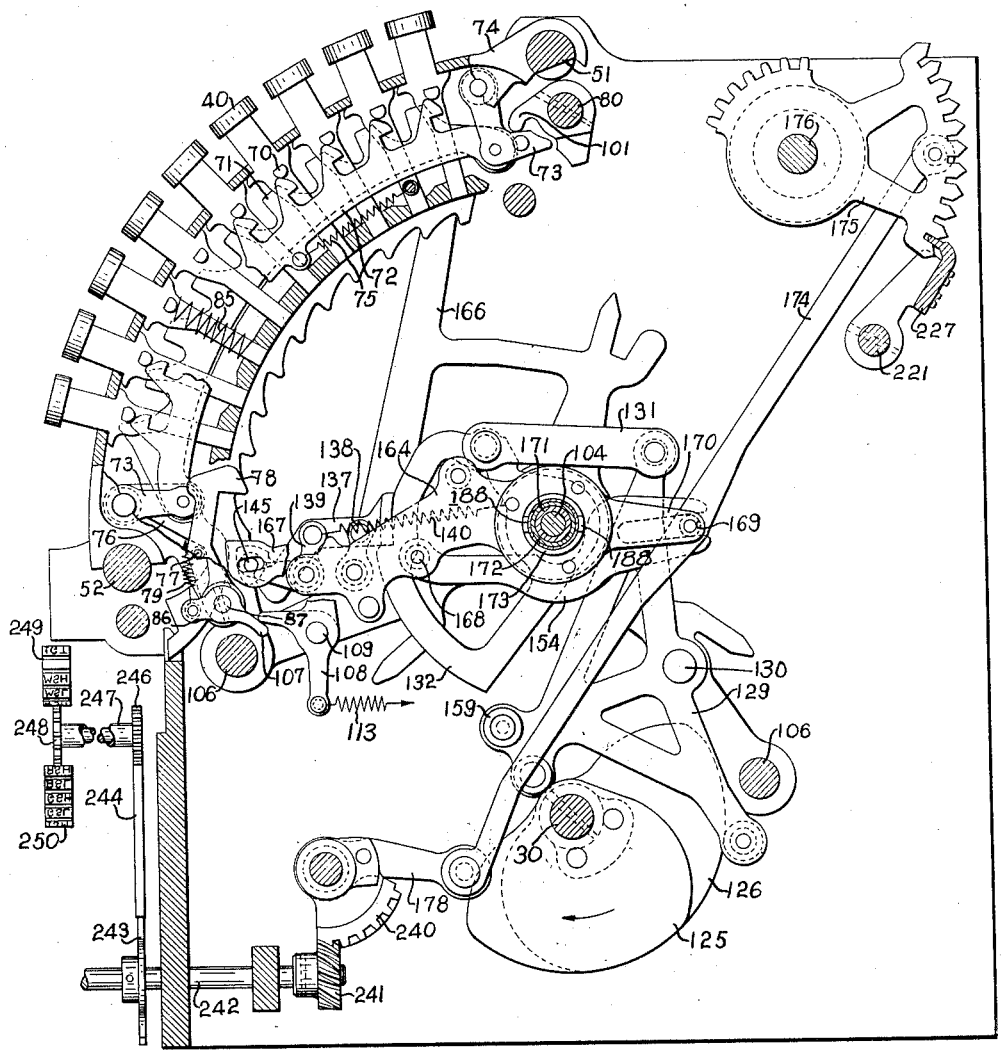
Fig. 2 is a section taken alongside the right-hand control key bank.

Described in general terms, the machine in a preferred form includes three lines of totalizers; an "upper" line, a "front" line, and a "back" line.

The "upper" line has one totalizer for each of the keys in the right hand control bank. The "back" line has one totalizer for each key in the middle control bank. The "front" line has one totalizer for each of the keys in the third or left hand bank of control keys.

The "upper" totalizer line also has a group totalizer into which is accumulated the amounts entered into the totalizers associated with the second and third banks of control keys. The "back" totalizer line has no group totalizer. The "front" totalizer line has a group totalizer into which is accumulated all of the amounts as they are added into the individual totalizers associated with the first or right hand bank of control keys. The group totalizer on the upper line will be hereinafter known as the first group totalizer and will be designated "1GT". The group totalizer on the front line will be hereinafter known as the third group totalizer and will be designated as "3GT".

The number of amount key banks with which the machine is provided may vary, according to the capacity desired by the customer. In this application the only amount bank shown is that shown in section in Fig. 3.

Associated with the totalizer lines is a differential mechanism adapted to accumulate into the selected totalizers, amounts as determined by the amount keys which have been depressed. This differential mechanism is also adapted to turn the totalizers to zero, as they are selected for that purpose, and to transfer the amount taken from one totalizer into one or more of the individual totalizer or totalizers as desired, or into one individual totalizer and one group totalizer, or into one group totalizer.

Printing mechanism is also associated with the amount differential mechanism so that the amounts as they are entered into the various totalizers, may be printed upon a detail strip. The differential mechanism also controls the printing mechanism to print the amounts as they are cleared from one totalizer and transferred into another totalizer.

Associated with each of the banks of control keys is a differential mechanism to select the totalizers as determined by the keys depressed in the respective banks. Also associated with each of these differential mechanisms is a printing means to print characters designating the totalizer, selected for addition, or for clearing, or to have an amount transferred thereinto, upon the detail strip.

None of the mechanism for pressing the detail strip against the type wheels is shown in this application. For a description thereof see the Shipley patent 1,619,796, above referred to.

While the captions used on the control keys are particularly adapted for the shoe store business, it is to be clearly understood that it is not the intention to limit this invention to such business, because the mechanism shown in this application is readily adaptable for use in very many different kinds of businesses.

In connection with the totalizer selecting mechanism novel means is provided, in this machine whereby a complete analysis of a business may be obtained by the proprietor.

The novel means mentioned is so combined and inter-associated with the totalizer selecting mechanism, and the total lever itself, that the proprietor may clear the third group totalizer, print that total on the detail strip and transfer that amount into the first group totalizer on the upper line as indicated by the direction lines leading from the keys in Fig. 1. He may also clear any, or all, of the totalizers on the front totalizer line and transfer those amounts into the first group totalizer on the upper line. He may also transfer any, or all, of the amounts from the totalizers except the "asterisk" totalizer on the back totalizer line into the first group totalizer on the upper line, and simultaneously transfer those amounts to any one of the totalizers on the front totalizer line. It can be clearly seen, therefore, that by using the machine in the manner just mentioned the proprietor may obtain a very detailed analysis of his business. The mechanism for accomplishing these results will be later described in detail.

*Operating mechanism*

Figure 5:
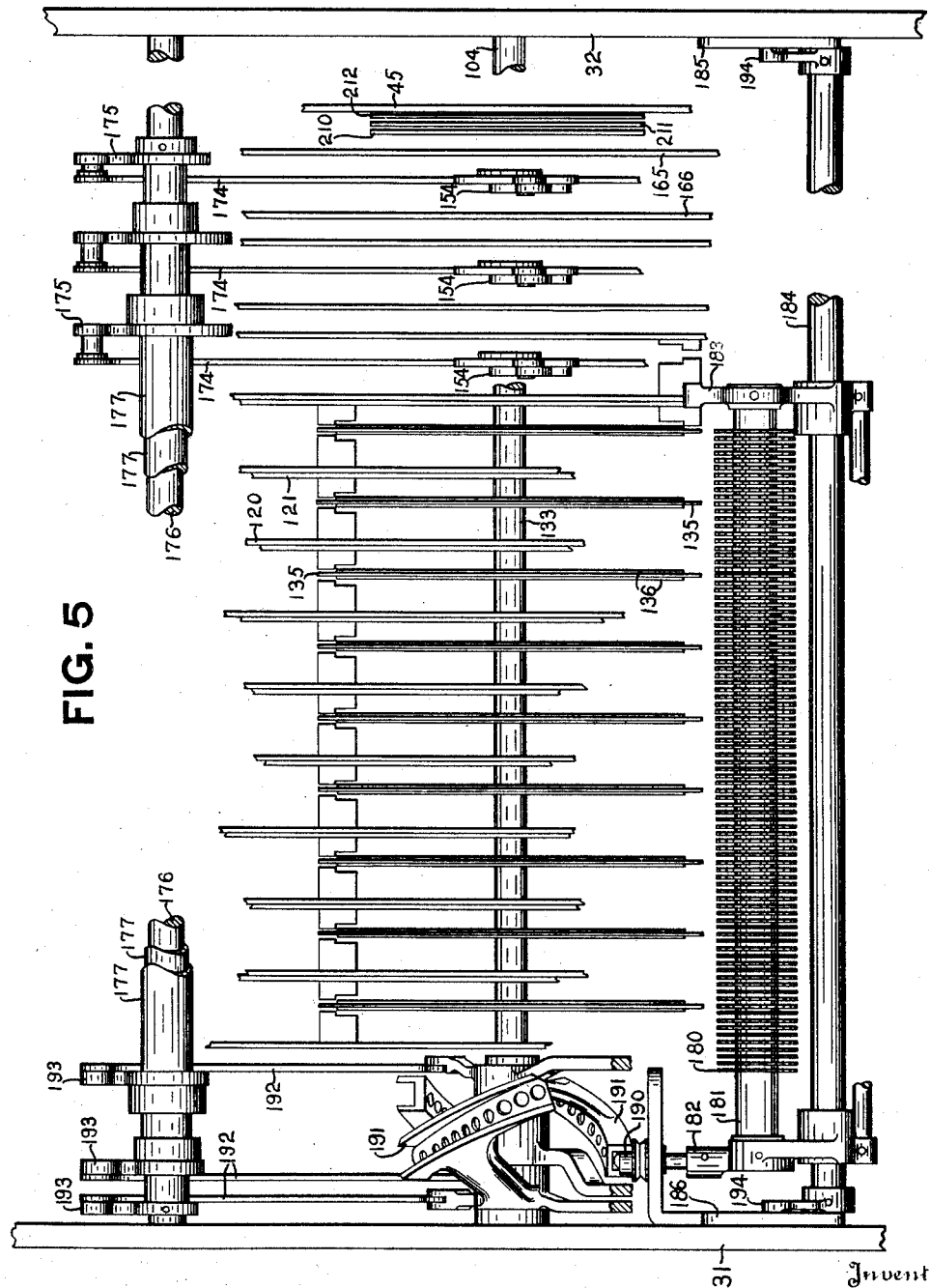
Fig. 5 is a front elevation of the totalizer shifting mechanism.

A main cam shaft 30 (Figs. 2, 3 and 7) is the means from which the various mechanisms in the machine receive their movement. This shaft is supported in the side frames 31 and 32 (Fig. 5).

Figure 7:
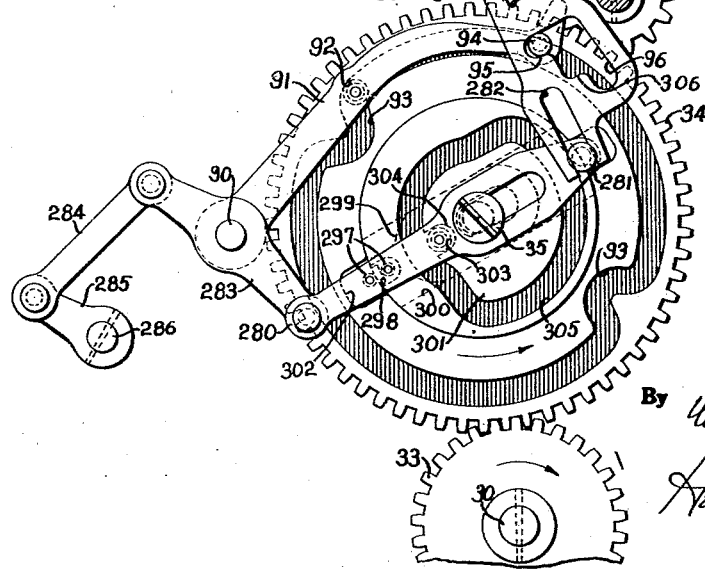
Fig. 7 shows the mechanism for changing the machine from a single cycle to a double cycle operation.

In Fig. 7 is illustrated one means for driving the cam shaft 30. Secured to this shaft 30 is a gear 33, meshing with a gear 34 mounted upon a stud 35 on the frame 32. The gear 34 is twice the diameter of the gear 33. Meshing with the gear 34 is a small gear 36 mounted on a shaft 37, supported by an auxiliary frame not shown in this application. The gear 34 is four times the diameter of the gear 36. The shaft 37 is adapted to have an operating handle (not shown) secured to one end of it, so that by turning the operating handle two complete rotations, the gear 34 is given a half rotation, thus rotating the gear 33 and cam shaft 30 one complete rotation in a clockwise direction, as viewed in Fig. 7.

If desired, the machine may be driven by means of a motor, such as that illustrated and described in Letters Patent of the United States No. 1,144,418, granted on June 29, 1925 to Charles F. Kettering and William A. Chryst. The adaptation of such a motor to a machine of the type illustrated in this application is shown, and described in the above mentioned Shipley Patent No. 1,619,796.

Keyboard

For illustrative purposes it may be assumed that the machine described herein is being used in a shoe store and, therefore, the captions on the control keys (Fig. 1) are such as might be there used.

Figure 3:
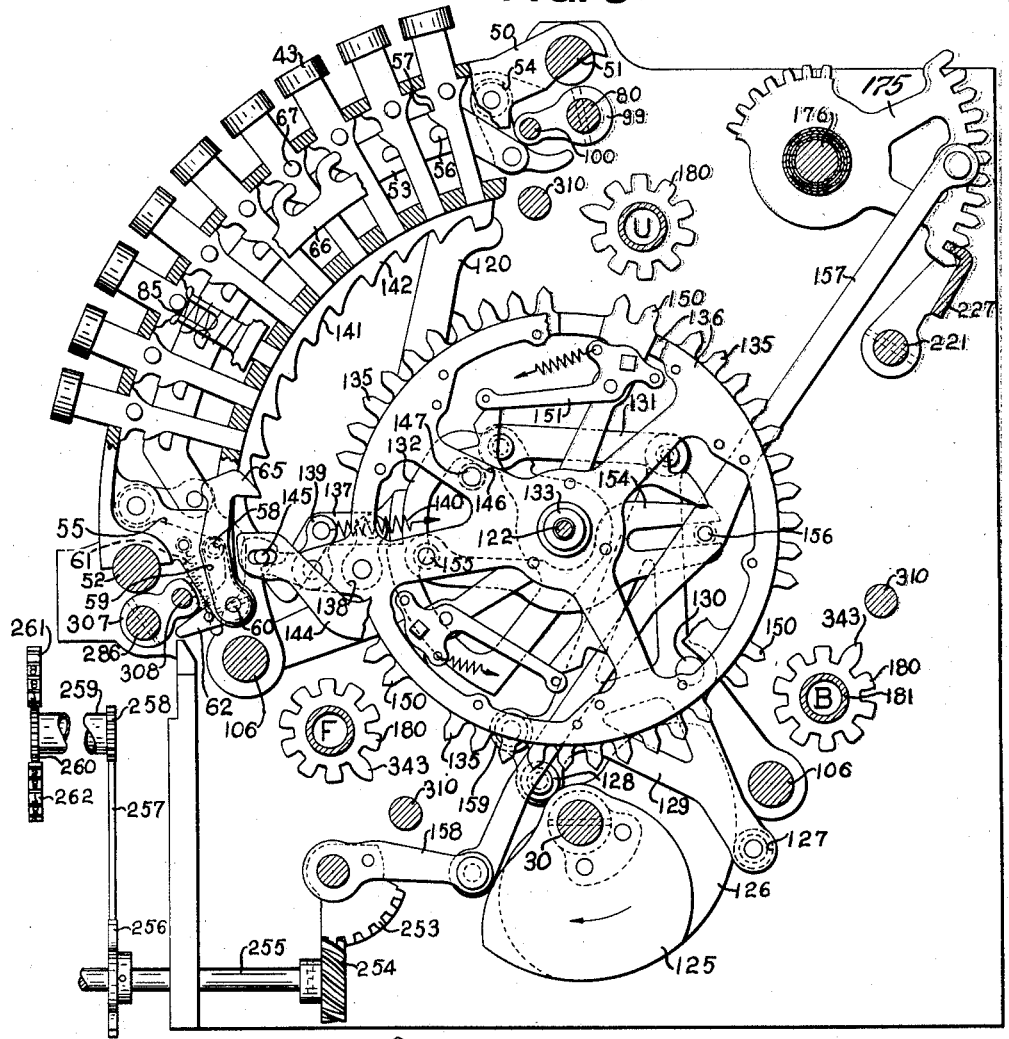
Fig. 3 is a section taken alongside one of the amount banks.

The keyboard of this machine includes three rows of control keys, designated Row 1, Row 2 and Row 3, (Fig. 1). The keys in row 1 are numbered 40, those in row 2—41, and those in row 3—42. Amount keys 43 are shown in Fig. 3 only. The number of rows of amount keys 43 may vary according to the demands of the business.

Also projecting through a slot 44 in the machine cabinet is a total lever 45, used during total taking operations and during total transfer operations to control the totalizer lines so that only one totalizer line may be selected to have a totalizer on that line cleared at one time.

Keyboard—Amount key banks

The construction of the key banks used in this machine is substantially the same as that shown and described in the Shipley Patent No. 1,619,796. Therefore, but a brief description will be given herein.

The amount keys 43 are supported by a frame 50 (Fig. 3) mounted on rods 51 and 52, carried by the frames 31 and 32.

The keys 43 cooperate with a flexible detent 53 supported at its upper end by an arm 54 and at its lower end by an arm 55, which arms are supported on studs in the frame 50. The detent 53 has a pin 56 for each key, and when a key is depressed its associated pin 56 moves the detent downwardly until a shoulder 57 on the key passes the pin 56 whereupon the detent 53 is raised slightly, by a spring 61, one end of which is attached to a stud on an arm 62 secured to a shaft 60, and the other end to a stud on the key frame 50. An arm 59 is also secured to the shaft 60 and has a stud 58 which contacts the arm 55. The spring 61 constantly urges the arms 62 and 59 clockwise, and through the stud 58, urges the arm 55 counter-clockwise to elevate the detent 53. Thus, when the key 43 is depressed, its corresponding stud 56 is moved over the shoulder of the key to retain the key in a depressed position.

When a key is depressed and the arm 55 thereby rocked clockwise, it will, through its engagement with the pin 58 rock a zero stop pawl 65, secured to the shaft 60, counter-clockwise out of the path of movement of the differential mechanism to be hereinafter described, thus permitting said mechanism to be controlled by the depressed key with the inner end of which, the differential latch contacts to stop the differential mechanism.

Upon release of the machine by mechanism, not illustrated nor described in this case because it forms no part of this invention, but fully illustrated and described in the above mentioned Shipley Patent No. 1,619,796, a locking detent 66 engages a pin 67 on the depressed key thus holding said key in depressed position until the proper time near the end of the operation of the machine, when the key is released. This locking detent also serves to prevent the depression of any of the other keys during an adding operation.

Keyboard—Control key banks

Since all three rows of control keys are identical, a description of one will suffice.

Each of the keys 40 has a pin 70 which extends through the key stems and cooperates with a controlling bar 71 and a locking detent 72. The detent 72 is supported by arms 73 mounted in a key frame 74 supported on the rods 51 and 52. A spring 75 serves to retain the detent 72 in its normal position. The bar 71 is supported at its upper end by an arm (not shown) like the arm 73 supporting the lower end of the detent 72, and at its lower end by an arm 76 which cooperates with a pin 77 on a zero stop pawl 78. The bar 71 and zero stop pawl 78 are held in normal positions by a spring 79, one end of which is attached to an arm 86, the other end being attached to the key frame 74. The arm 86 is secured to a short shaft 87, to which shaft the zero stop pawl 78 is also secured. The shaft 87 is journaled in the key frame 74.

When a key 40 is depressed, its pin 70 moves the bar 71 downwardly thereby rocking the zero stop pawl counter-clockwise, so that the differential mechanism may be controlled by the key and not be stopped in the zero position. As the key 40 is depressed its pin 70 also moves the locking detent 72 downwardly until the pin 70 passes the hook on the detent, after which the spring 75 raises the detent, thus locking the depressed key in depressed position.

The banks of keys 40, 41 and 42 are also known in this art as control keys, that is, they control interlocks to permit the release of the machine for operation. In this machine, a releasing bar (not shown), but like that disclosed in my Patent, No. 1,602,596, issued April 27, 1923, is provided, which upon being depressed after the depression of any one key in any one control bank, will release the machine for operation.

The mechanism operated by the releasing bar for releasing the machine is not shown in this application but for a detailed description thereof, reference may be had to the above mentioned Shipley Patent No. 1,602,596, wherein a full illustration and description of this mechanism will be found.

In the system disclosed herein to illustrate the invention, the control keys 40, 41 and 42 are so arranged that only one key is depressed for any one adding operation of the machine, and, therefore, only one individual totalizer, and one group totalizer, will be rocked into mesh with the actuators for any adding operation. However, it is not intended to limit the invention to the system disclosed herein, since it can be arranged so that all three lines of totalizers can be engaged with the actuators for a given adding operation, should any system require such engagement.

For this case it is sufficient to state that after one of the keys 40, 41 or 42 is depressed the releasing bar can be depressed, and thereupon a shaft 80 (Figs. 2, 3 and 7) is rocked clockwise by a spring 81 guided by spring pilots 82 (one only shown) mounted on a stud 83 on an arm 84, secured to the shaft 80.

Keyboard—Automatic key release

Near the end of the operation of the machine all of the depressed amount keys and the depressed control keys are released so that they may be returned to their normal positions by their springs 85.

Pivoted on a stud 90 in the frame 32 is an arm 91 (Fig. 7) having a roller 92 cooperating with a cam race 93 in the gear 34. The arm 91 also has a pin 94 normally engaging a shoulder 95 in a slot 96 of a link 97. The link 97 has a slot 98 into which projects the stud 83 on the arm 84. The spring 81 is located within the slot 98.

As previously stated, the gear 34 receives a one-half rotation for each adding operation of the machine, and therefore, there are two camming sections of the race 93 spaced 180 degrees apart.

Also secured to the shaft 80 is a pair of arms 99 (one shown in Fig. 3) supporting a rod 100 associated with the arms 54 of all banks of amount keys 43. Also secured to the shaft 80 are three arms 101 (one shown in Fig. 2) one associated with each upper detent arm 73 of each of the rows of control keys.

Near the end of the operation of the machine the arm 91 (Fig. 7) is rocked clockwise, which lowers the link 97 and through its engagement with the stud 83 rocks the shaft 80 counterclockwise. This movement of shaft 80 causes the rod 100 to engage the lower end of all of the arms 54 thus moving the flexible detents 53 downwardly. The locking detents 66 are also moved downwardly by means, not shown but which is well known and illustrated in the above mentioned Shipley patent, which means releases the amount keys 43 when the shaft 80 is rocked by the arm 91. At the same time the arms 101 engage the arms 73 and move the detents 72 downwardly, thus releasing the control keys 40, 41 and 42. The cam 93 then restores the link 97 to normal position.

Keyboard—Total lever

Figure 6:
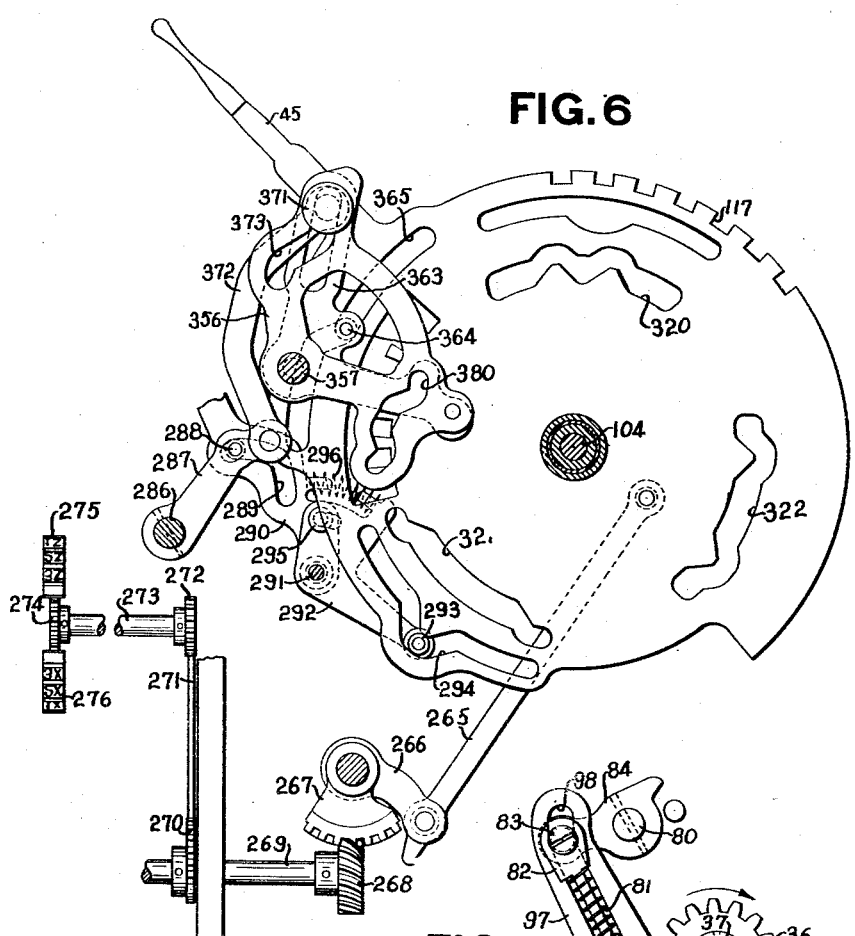
Fig. 6 shows the mechanism operated by the total lever for controlling the engagement of the totalizers during total taking and total transfer operations.

The total lever 45 (Fig. 6), is a substantially circular plate having a finger piece extending through the cabinet for manipulation by the operator. The total lever is not mounted directly upon, but is supported by a rod 104 (Fig. 9) supported at one end by a trunnion screw in the frame 32, and at the other end in a hanger 105 mounted on rods 106 (Figs. 2 and 3), supported by the side frames 31 and 32. This total lever 45, through mechanism to be hereinafter described, controls the machine for total, sub-total, and total transfer operations.

Keyboard—Interlocks

To prevent the total lever 45 from being moved out of its position after one of the keys 40, 41 or 42 has been depressed, there is an arm 107 rigid with each of the arms 86 (Figs. 2 and 17), which arms, it will be recalled, are connected to the zero stop pawls 78. Levers 108 secured to a short shaft 109, are normally held in contact with the arms 107 by a spring 113. The shaft 109 also has secured thereto an arm 110 having a bent-over toe 111, which cooperates with notches 112 in the total lever 45.

When any one of the zero stop pawls 78 is rocked counter-clockwise upon depression of any one of the keys 40, 41 and 42, the associated arm 107 is rocked likewise, and through its engagement with the arm 108, causes the toe 111 to enter one of the notches 112, thereby positively locking the total lever against any movement after the depression of one of the keys.

When the zero stop pawls 78 are restored to normal positions, the spring 113 (Fig. 17) restores the levers 108 and arm 110 to normal positions.

It is also essential that the total lever 45 be set exactly in one of its several positions before the machine is released for operation.

Fig. 17 shows a portion of this mechanism. A lever 115 having a toe 116 cooperates with notches 117 in the total lever 45. When the lever 45 is set exactly in one of its various positions the toe 116, upon release of the machine, then enters one of the notches 117. If the lever is not in its exact position the toe 116 engages one of the high spots between the notches, thus preventing the machine from being released, in a manner fully illustrated and described in the above mentioned Shipley Patent No. 1,619,796.

This same lever 115 is also operated by means to be hereinafter described, to prevent any movement of the total lever 45 during the time the totalizers are being engaged with and disengaged from the actuators, whether it be an adding operation, a total taking operation or a total transfer operation.

Differential mechanism

The differential mechanism is used to differentially operate the various totalizers, and to select them for operation. It is also used as a means for clearing the totalizers, and as a means for transferring the amount which is cleared from a totalizer to one or more totalizer or totalizers in the machine.

Amount differentials

There is a differential unit for each of the banks of amount keys and there may be one or more extra units of higher denomination than said keys. These units of higher denomination are to be operated only when a carry to them is necessary and during total taking and total transfer operations.

The amount differential mechanism used in this machine is substantially the same as that illustrated and described in the above mentioned Shipley and Fuller patents and also in Letters Patent of the United States, No. 1,230,864 granted on June 26, 1917 to William A. Chryst.

Each amount differential unit is supported by hangers 120 and 121, (Figs. 3 and 5) mounted on the rods 106. A rod 122 having a bearing at one end in the hanger 105 (Fig. 9) extends through all of the amount differential units and acts as a stabilizer for them.

Each differential unit is driven by a pair of cams 125 and 126, (Fig. 3) fastened on the cam shaft 30. The timing for these cams is shown in the time chart (Fig. 21) opposite the title "Add operation—Amount differentials". Each pair of cams 125 and 126 cooperates with rollers 127 and 128 on a Y-shaped lever 129 pivoted on a stud 130 on the hanger 120.

Pivoted to the lever 129 is a link 131 also pivoted to a driving segment 132 loosely mounted on a hub 133 which separates the hangers 120 and 121. The clockwise movement of the cams 125 and 126 rocks the segment 132, first clockwise and then counter-clockwise, to normal position.

There are three differentially movable segments or actuators 135, one associated with each of the three totalizer lines, mounted between two nearly circular plates 136 which in turn are pivoted upon the hub 133.

The differential segments 135 and plates 136 are connected to the driving segment 132 by a latch 137 carried by an arm 138, and a bell crank 139 pivoted to the plates 136. The latch 137 is held in engagement with a shoulder on the segment 132 by a spring 140.

By this connection the segments 135 are rotated clockwise (Fig. 3) until the forward end of the bell crank 139 strikes the end of a depressed key. When this occurs the arm 138 and bell crank 139 are rocked counter-clockwise, thus disengaging the latch 137 from the segment 132.

Figure 4:
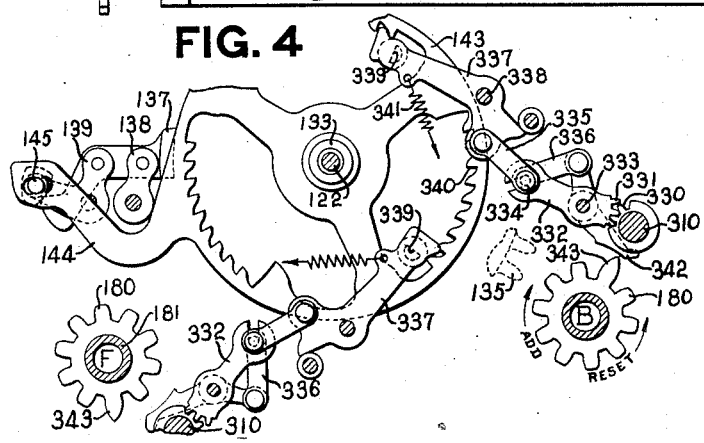
Fig. 4 is a fragmentary view of a part of the mechanism for controlling the differential mechanism during total taking operations.

When the latch is thus disengaged, the foot thereof rides upon the outer periphery of the segment 132, and the forward end of the latch 137 engages a notch 141, opposite the key depressed, in a bar 142 supported by the forward rod 106, and the upper end of the hanger 120. There are ten notches 141, one for each of the nine keys, and one at the zero position. When there is no amount key depressed, the latch is disengaged in the zero position. Adjacent one of the plates 136 there is pivotally mounted a reset spider 143 (Fig. 4) having an arm 144 with a slot into which projects a pin 145 in the bell crank 139. This arm 144 is in line with the zero stop pawl 65. Consequently when no key is depressed and the plates are rocked clockwise, the arm 144 contacts with the zero stop pawl and causes the latch 137 to be disengaged from the driving segment 132, thus stopping the differential segment in the zero position.

When the segment 132 is rotated counter-clockwise (Fig. 3) a shoulder 146 thereon engages a pin 147 on the plates 136 and restores them and the differential segments 135 to normal positions. The time when the segment 132 contacts the pin 147 varies according to the key which has been depressed. If the "2" key has been depressed the segment 132 does not contact the pin 147 until near the end of its movement. However, if the "9" key has been depressed and the latch disengaged at the "9" position, the shoulder 146 immediately contacts the pin 147 upon the return movement of the segment 132 thereby causing a greater rotation of the totalizer wheel which has been previously engaged with the segment 135.

As will appear later, the totalizers are rocked into engagement with the segments 135, during adding operations, after the latches 137 have been disengaged from the segments 132, so that, as the segments 135 are returned to their normal positions the amounts, as determined by the depressed keys, are accumulated on the totalizers.

*Differential—Transfer or carrying*

The carrying mechanism in this case is identical with the carrying mechanism illustrated and described in the above mentioned Shipley Patent No. 1,619,796 and also in the Chryst Patent No. 1,230,864. It has been only partially illustrated here and will be but very briefly described.

Associated with each of the segments 135 is a 2-toothed segment-arm 150 (Fig. 3) pivoted to the plates 136. Considering now the segment 135 and segment-arm 150 associated with the upper totalizer line, when the segment 135 is rocked clockwise it closes the gap between itself and the segment-arm 150, thus permitting that segment-arm to be positively coupled to the segment 135 by a lever 151, in a manner fully described in the above mentioned patents. As the segment 135 is moved counter-clockwise to its home position, if no carry has taken place, the 2-toothed segment-arm 150 is stopped in the position shown in Fig. 3 by means not shown. If, however, a carry has taken place, this segment-arm moves one step farther in a counter-clockwise direction before it is stopped, thus causing "one" to be added into the totalizer pinion, in addition to the amount added under the control of the amount keys.

*Differential—Beam*

Associated with the differential mechanism is a beam 154 pivoted at 155 to the plates 136. The beam 154 is slotted to receive a stud 156 on a link 157, the upper end of which is connected to the indicating mechanism segments. The indicating mechanism is not shown in this application, as it forms no part of the invention. The lower end of the link 157 is pivoted to an arm 158, connected to the printing mechanism, to be hereinafter described.

As previously described, the lever 129, through the link 131 and segment 132 drives the plates 136 until the latch 137 is disengaged from the segment 132, either by the zero stop pawl 65 or the end of a depressed amount key. This movement of the plates 136 positions the left end of the beam 154 accordingly. The lever 129 carries a roller 159, which, when the lever 129 is rocked clockwise, contacts the under side of the beam 154 and moves the beam 154 about its pivot 155 until its upper edge contacts a hub on the plates 136, thereby positioning the right end of the beam, and consequently the link 157 and arm 158, to set the type wheels and indicator selecting segments according to the value of the key depressed.

*Control bank differential*

The differential mechanism which cooperates with the banks of control keys is similar to that used in connection with the amount banks except that the differentially movable segments 135 and plates 136 are omitted and are replaced by an arm 164.

The differentials for the control banks are mounted between hangers 165 and 166 (Figs. 5 and 9) supported on the rods 106 (Fig. 2). These hangers are spaced apart by hubs, as shown in Fig. 9.

All three differential arms 164 are identically the same and are all driven in the same manner, and therefore, a description of the one associated with the keys 40 will suffice. The arm 164 carries a latch device comprised of a latch 137, an arm 138 and a bell crank 139, identical with those used in connection with the amount banks. The latch 137 is held in engagement with the shoulder on the driving segment 132 by a spring 140.

The segment 132 receives its movement from a link 131 pivoted to a Y-shaped lever 129 oscillated by a pair of cams 125 and 126 on the cam shaft 30.

In lieu of the reset spider 143 and arm 144 (Fig. 4) used in connection with the amount banks, each of the control banks has adjacent to the arm 164, an arm 167 (Fig. 2) the forward end of which is shown as engaging a pin 145 on the bell crank 139. The forward end of this arm lies in the plane of the zero stop pawl 78 and causes the latch 137 to be disengaged from the driving segment 132 in the zero position, in case no key is depressed in the bank.

Pivoted at 168 to the arm 164 is the usual beam 154 bifurcated to straddle a pin 169 on an arm 170. The arm 170 associated with the keys 42, is secured to a long sleeve 171 (Fig. 9) loose on the rod 104. The arm 170 associated with the keys 41, is secured to a sleeve 172 mounted on the sleeve 171, and the arm 170 for the keys 40 is secured to a sleeve 173 mounted on the spacer hub for the hangers 165 and 166. The pin 169 also extends into a hole in a link 174, the upper end of which is connected to a segment 175 fast on a shaft 176. The segments 175 for the banks of keys 41 and 42 are fastened to sleeves 177 (Fig. 5). The shaft 176 and sleeves 177, at the other end of the machine, are connected to mechanism which shifts the totalizer lines to select the various totalizers under the control of the keys 40, 41 and 42. This mechanism will be later described. The lower end of the link 174 is connected to an arm 178 (Fig. 2), connected to the printing mechanism, which will be later described.

The lever 129, (Fig. 2) carries a roller 159, which cooperates with the beam 154 in the same manner that the rollers 159 associated with the amount banks, cooperate with their beams 154.

In some machines of the type illustrated herein, the amount indicator segments (Fig. 3) and the segments 175 (Fig. 2) are used to set indicating devices.

Totalizers

As has been previously stated, there are three lines of totalizers in this machine. The upper line has nine individual totalizers and one group totalizer thereon. These nine totalizers are for the keys in row 1. The group totalizer 1GT on this line accumulates all of the totals added into the totalizers on the front and back lines except the amounts listed on the totalizer associated with the "asterisk" key. The back line has nine individual totalizers, one for each of the keys 41 of row 2. The front line has nine individual totalizers, one for each of the keys 42, and one group totalizer 3GT. Upon this group totalizer are accumulated all amounts as they are entered into the individual totalizers on the upper line. This totalizer arrangement is shown by the thin lines in Fig. 1, which show which individual totalizers have their amounts added in to each grand totalizer.

Fig. 5 shows the front totalizer line. These totalizers are of the same type as those illustrated in the Chryst Patent No. 1,230,864, the Fuller Patent No. 1,394,256, and also in a Fuller Patent No. 1,242,170, granted on October 9, 1917.

In Fig. 3 the totalizer lines have been designated by the characters "U", "B", "F".

Each totalizer includes a plurality of pinions 180. The pinions for the same denomination for all totalizers are grouped together, that is, all the units pinions of all totalizers are in one group, the tens pinions are in another group, the hundreds pinions in another group, and so on. These are known in the art as interspersed totalizers. The pinions 180 (Figs. 3, 4 and 5) are loosely mounted upon a tube 181, carried by arms 182 and 183, slidably mounted on rods 184 supported by plates 185 and 186, secured to the side frames 31 and 32.

The arms 182 and 183 and tube 181, constitute a laterally adjustable frame used to shift the totalizers laterally, according to the selection desired.

The totalizer lines are slid laterally under the control of the keys 40, 41 and 42. The arm 182 carries a roller 190 cooperating with a drum cam 191 connected by a link 192 to an arm 193. There are three drum cams 191, three links 192 and three arms 193. One of the arms 193 is fastened to the shaft 176 and the other two arms are each fastened to a sleeve 177.

From the above description it will be clear that the movement of the beam 154, previously described, as determined by the key depressed in the control bank, shifts the drum cam 191 accordingly, whereby through the roller 190, the totalizer frame is shifted to a position to select the totalizer corresponding to said key.

During adding operations, after the differential mechanism has been set according to the values of the keys which are depressed, the selected totalizer is rocked into engagement with the actuating segments 135, so that upon restoration thereof to normal positions, the amount as determined by the values of the keys depressed is entered into the totalizer. On each end of the shaft 184 is an arm 194 (Figs. 5, 14 and 16) having a roller 195 cooperating with a cam slot 196 in the plate 185. Pivoted to the right-hand arm 194 (Fig. 5), is a link 197 (Figs. 13, 14 and 15), carrying a stud 198 adapted to be engaged by an offset fork 199 (Fig. 15) of a totalizer adding engaging plate 200.

During adding operations this plate 200 (Fig. 14) is rocked clockwise and then counter-clockwise by a link 201 engaging a stud 202. This link 201 is pivoted to a lever 203 operated by a pair of cams 204 and 205, secured to the cam shaft 30.

There are three offset forks 199 on the plate 200, and whichever one of the studs 198 is in engagement with its fork will cause the link 197 to rock its associated arms 194 counter-clockwise. This movement, through the roller 195 and slot 196 causes the shaft 184 to be moved toward the center of the machine a distance sufficient to engage the totalizer pinions 180 with the segments 135.

After the differential mechanism has been restored to normal position and the amounts entered into the totalizers, the plate 200 (Fig. 14) is rocked counter-clockwise to its normal position, thus disengaging the totalizers from the differential mechanism.

The timing for the movement of this plate 200 is shown in the time chart (Fig. 21) opposite the heading "Adding operation—totalizer adding engaging plate".

Totalizer—Engaging controlling mechanism

From the above description it can be seen how the totalizer lines are engaged with and disengaged from the differential segments 135.

As previously stated, in the system adopted to illustrate the invention, only one of the individual totalizers is added on at a time. Of course it is possible to depress a key in each of the three banks of control keys, thus controlling the machine to cause all the totalizer lines to engage the actuators, but in the system used in this application, the operator never depresses more than one control key for an adding operation. Everytime one of the individual totalizers except the "asterisk" totalizer is added upon, either the first group totalizer 1GT, or the third group totalizer 3GT is also engaged with the segments 135 to have accumulated thereon the same amount which goes into the individual totalizer. The group totalizer selected, depends upon which of the individual totalizers is being added upon. This is controlled by what is known as a totalizer line selecting mechanism, which will now be described.

Before going into the detailed description, it might be well to give the general location of the various totalizers on the various totalizer lines.

Referring particularly to Fig. 1, and to the keys constituting row 1, each key has associated therewith an individual totalizer. The totalizer for "men's shoes" is in the ninth position on the upper totalizer line. The "men's slippers" totalizer is in the eighth position on the upper line, and so on, the "infants' shoes" totalizer being in the 1 position. The first group totalizer "1GT" is in the zero position on the upper line.

Referring now to row 2, the "men's hose" totalizer is in the ninth position on the back totalizer line, the "women's hose" totalizer is on the eighth position on the back line, and so on down. The totalizer in the first position associated with the asterisk key may be used for listing miscellaneous amounts. However, the amounts added into this totalizer are not added into the "1GT" totalizer. On this back totalizer line there is no group totalizer.

Referring now to row 3, the "men's rubbers" totalizer is in the ninth position on the front line, the "women's galoshes" totalizer is in the fourth position on the front line, the "repairs" totalizer is in the first position on the front line. The third group totalizer "3GT" is in the zero position on the front line.

Each row of keys 40, 41 and 42 has associated therewith a totalizer line selecting plate. Connected to the arm 170 for the first row of keys, by the sleeve 173 and a collar 187, is a selecting plate 210 (Fig. 9), the collar being secured to the sleeve by a tongue and groove joint 188 (Figs. 2 and 9); connected to the arm 170 for the second row of keys by the sleeve 172 is a selecting plate 211; and connected to the sleeve 171 for the arm 170 of the third row of keys is a selecting plate 212. (See also Figs. 8 and 19.)

From the above description it will be clear that whatever movement is imparted to the beams 154, is also imparted to the selecting plates 210, 211 and 212. In other words they are set differentially, according to the keys depressed in the control rows, and left in that position throughout the remainder of the operation of the machine. Upon a subsequent operation of the machine they are set according to the key depressed for this subsequent operation.

All three of these plates 210, 211 and 212 cooperate with all three of the totalizer lines. For this reason each plate is divided into three sections. Fig. 1 shows how the plates are divided, and how they cooperate with the upper, front and back totalizer lines. Each section is divided into high and low spots or portions.

The position on the plates corresponding to the location of the keys and the totalizers are marked in Fig. 1.

On plate 210, for the first row of keys, that part of the periphery associated with the front totalizer line, has formed therein a low spot opposite the zero position and high spots opposite all of the other positions 1 to 9 inclusive. On that part of the periphery cooperating with the back totalizer line, all ten positions, zero and 1 to 9 inclusive, are low spots. The same is true of that portion of the plate which cooperates with the upper totalizer line.

That portion of the plate 211, for the second row of keys, and associated with the front totalizer line, has low spots opposite all of the ten positions, zero and 1 to 9 inclusive. That portion of this plate 211 which cooperates with the back totalizer line, has a low spot opposite the zero position, and high spots opposite the other nine positions. This same plate 211 has, on that section which cooperates with the upper totalizer line, high spots in all positions except the "1" position.

For plate 212, which cooperates with the third row of keys, that portion of the periphery associated with the front totalizer line, has a low spot opposite the zero position, and high spots opposite the other positions 1 to 9 inclusive. That section of the plate 212, associated with the back totalizer line has low spots in all ten positions. The section of plate 212 associated with the upper totalizer line, also has low spots opposite all ten positions.

Lying adjacent the peripheries of all three plates 210, 211 and 212 are three pins 213 (Figs. 8 and 19), each pin being associated with one of the three totalizer lines. The pins 213 are carried by levers 214, pivoted at 215 to a stationary plate 216, (Fig. 12) supported by the rods 106. Springs 217 attached to the levers 214 tend to hold the pins 213 against the peripheries of the plates 210, 211 and 212.

For this reason it is necessary, before the plates 210, 211 and 212 can be differentially positioned, that each pin 213 be moved away from the peripheries of said plates. To accomplish this there is pivoted upon a hub on the rod 104 a three-armed lever 218 (Figs. 8, 9 and 19). The end of each arm has a cam 219. When the lever 218 is moved counter-clockwise (Fig. 8), the cams contact the pins 213 and rock the levers 214 counter-clockwise about their pivots 215 thus moving the pins 213 away from the peripheries of the plates 210, 211 and 212 so that the plates will clear the pins when said plates are being differentially positioned.

Connected to the lever 218 is an arm 220 (Fig. 8) fastened on a shaft 221 to which is also secured an arm 222. Pivoted to this arm is a link 223, also pivoted to a lever 224, carrying a pair of rollers 225, cooperating with a pair of cams 226 secured to the shaft 30.

These cams 226 through the connections just described, oscillate the lever 218 counter-clockwise and then clockwise.

These cams cause the lever 218 to move the pins 213 away from the plates 210, 211 and 212 before the differential mechanism starts to move. The pins 213 are held in these positions until after the plates 210, 211 and 212 have been differentially positioned, after which the lever 218 is rocked clockwise thus permitting the springs 217 to move the pins into contact with the peripheries of said plates.

This pair of cams 226 ordinarily operates the indicator aligner 227 (Figs. 2 and 3).

Each of the levers 214 has a cam slot 230 (Figs. 8, 11 and 19) running into a slot 231 concentric with the center of the rod 104 when the edge of the pin 213 is adjacent a high spot on the peripheries of the selecting plates 210, 211 and 212.

Figure 11:
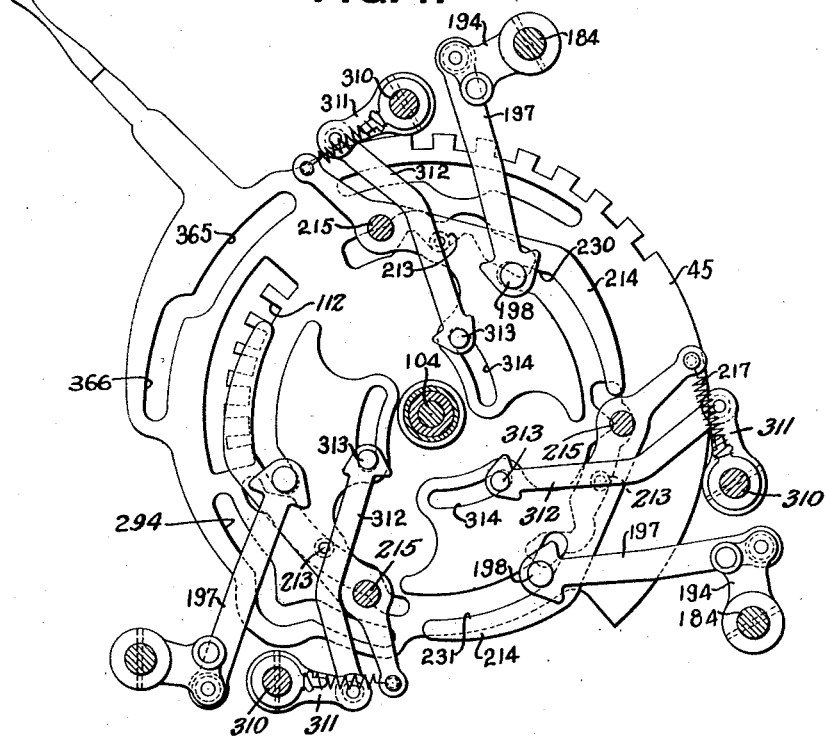
Fig. 11 shows the connection between the total lever, the totalizer line engaging selecting mechanism and the totalizer reset shaft mechanism.

The previously described pins 198 on the totalizer engaging links 197, normally rest in the cam slots 230, as shown by the pins 198 associated with the upper and front totalizer lines (Fig. 11).

When the lever 218 (Fig. 8) permits the levers 214 to be rocked by their springs 217, if there is a low spot on the peripheries of all three plates 210, 211 and 212, opposite any one of the pins 213, those pins 213 will permit their levers 214 to move to the positions assumed by the upper and left hand levers 214. With these levers 214 in such positions their cam slots 230 cause their associated pins 198 to assume the positions shown in Figs. 12, 13 and 14, wherein they are not engaged by the forks 199 of the engaging plate 200.

Figure 13:
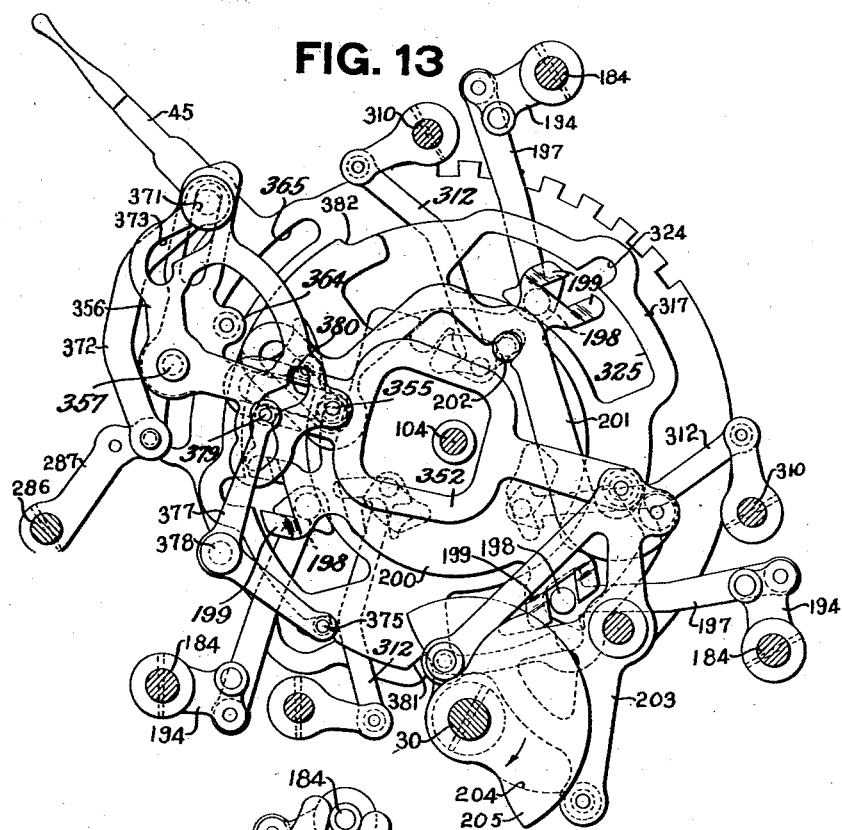
Fig. 13 shows the totalizer engaging plates, the operating means therefor, and their control by the total lever.
Figure 14:
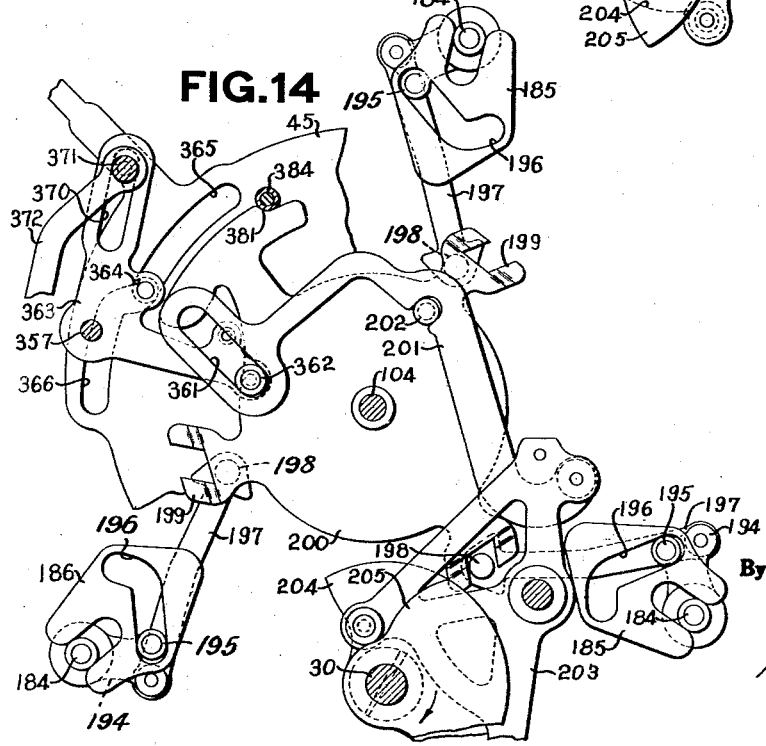
Fig. 14 shows the adding engaging plate and the mechanism whereby it is rendered ineffective by movement of the total lever to certain positions.
Figure 15:
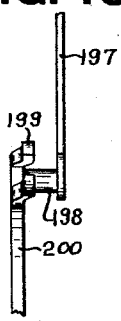
Fig. 15 is a detail of one of the totalizer engaging links and the adding engaging plate.

When the levers 214 are moved by their springs in the manner just described, should any one of the three plates 210, 211 or 212 present a high spot opposite any of the pins 213, then those levers 214 would assume a position shown by the lower right hand lever 214 (Fig. 8). When the lever 214 is in this position, its cam slot 230 causes the pin 198 to be moved out into the fork 199 of the engaging plate 200, as shown by the lower right hand pin 198 (Figs. 13 and 14).

When a pin 198 is engaged with a fork 199, the clockwise movement of the plate 200, as previously described, rocks the shaft 184 counter-clockwise by means of the link 197 and arm 194. This counter-clockwise movement as previously described (Fig. 14), causes the shaft 184 and consequently the totalizer frame to be moved toward the center of the machine so as to cause the selected totalizer pinions 180 to engage the differential segments 135.

As previously stated, the high and low spots on the plates 210, 211 and 212 are cut according to the system desired by the merchant that is buying a machine.

In this case, and for illustrative purposes only, the high and low spots of the three plates 210, 211 and 212 are arranged so that when, during adding operations, the plate 210 is set in any of its positions 1 to 9 inclusive, when a key 40 is depressed, a high spot is presented opposite the pin 213 associated with the front totalizer line. Consequently, since none of the keys in row 3 is depressed, the totalizer "3GT" in the zero position on the front totalizer line, is engaged with the differential segments 135. As the plate 211 for the second row of keys is not moved when a key in the first row is depressed, and since there is a high spot in the zero position on this plate opposite the pin 213 associated with the upper totalizer line, any totalizer on this upper line, selected by depression of any key 40 in row 1, is also moved into engagement with the segments 135. Since the plate 210 has low spots in all ten positions associated with the pin 213 for the back totalizer line, and as the plate 211 has a low spot in the zero position opposite this same pin, and as the plate 212 has low spots in all ten positions opposite said pin, the back totalizer line is not moved into engagement with the actuating segments when any key 40 in the first row is depressed during adding operations.

When a key 41 in the second row is depressed during adding operations, the plate 211 assumes the position corresponding to said depressed key and the plates 210 and 212 do not move. The plate 211 has high spots in all positions, 1 to 9, opposite the pin 213 for the back totalizer line, therefore, when any key 41 is depressed the back totalizer line is moved to engage the selected totalizer on that line with the differential segments 135. This plate 211 also has high spots in positions zero and 2 to 9 inclusive, opposite the pin 213 associated with the upper totalizer line, and as there is no key depressed in the first row during an adding operation when a key is depressed in the second row, with the exception of the No. 1 key the totalizer "1GT" in the zero position, is engaged with the differential segments 135. Because of the low spot opposite the pin 213 for the front totalizer line on the plate 212, and as there are ten low spots on the plate 211 opposite said pin 213, none of the totalizers on the front line are engaged with the differential segments during an adding operation when a key 41 in row 2 is depressed.

When a key 42 of row 3 is depressed, the plate 212 is moved to the position corresponding to said depressed key. This plate 212 has high spots in the 1 to 9 positions opposite the pin 213 for the front totalizer line. Consequently, this line is moved to engage the selected totalizer thereon with the differential segments when any key 42 is depressed during adding operations. At this time the plates 210 and 211 do not move. Since the plate 211 has a high spot in the zero position opposite the pin 213 for the upper totalizer line and as no key 40 is depressed in row 1 at this time, the 1GT totalizer is engaged with the segments 135 and consequently, whatever amount is accumulated into the totalizer on the front line associated with the depressed key 42, is also accumulated into the "1GT" totalizer.

The stationary plate 216 (Figs. 12 and 19) has three openings 232 into which the pins 198 project. When the pins 213 engage low spots on all three plates 210, 211 and 212, and the pins 198 are moved to the positions occupied by the upper and left hand pins 198 in Figs. 11 and 13, then these pins engage the narrow part of the openings 232 and are thus locked against movement. When, however, the pins 213 engage high spots on any one of the plates 210, 211 or 212, then the each pin 198 assumes a position shown by the lowermost one in Fig. 12, in which it is free to move in the wide portion of the opening 232, so that the totalizer line may be engaged with the actuating segments 135.

*Printer*

Only so much of the printing mechanism is shown in this case as is necessary to show how the type wheels are set under control of the total lever 45, the control keys 40, 41 and 42, and the amount keys 43.

The printing mechanism fully illustrated and described in the above mentioned Shipley Patent No. 1,619,796, may be used on the machine described herein, with a very slight change which will be hereinafter described in detail.

Figure 22:
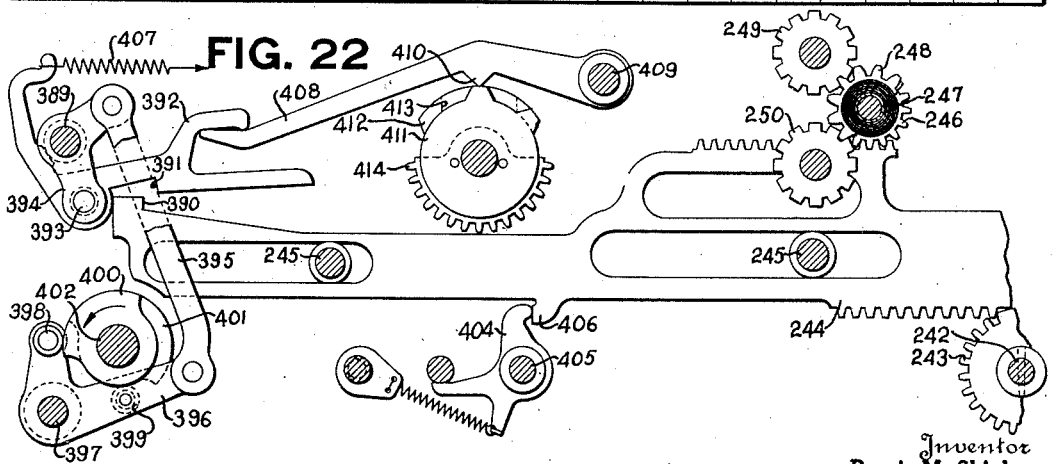
Fig. 22 shows one of the printing racks and co-operating mechanism for printing characters in connection with one of the control banks of keys and the total lever.

Since the means for setting the type wheels associated with the three banks of keys 40, 41 and 42 are practically the same, a description of one of these setting mechanisms will suffice. In Fig. 2 is shown the type setting mechanism associated with the first row of control keys 40, and in Fig. 22 is shown the type setting mechanism associated with the third row of keys 42. The same reference characters will be applied to both.

Secured to the previously described arm 178 (Fig. 2) is a spiral segment 240 meshing with a spiral gear 241 fastened on a shaft 242. This shaft has secured thereto a spur gear segment 243 meshing with the under side of a rack 244 slidably mounted on studs 245 (Fig. 22). The upper side of the rack 244 meshes with a gear 246 on a sleeve 247 to the other end of which is secured a gear 248 which meshes with an upper type wheel 249 and with a lower type wheel 250.

Through the train of gearing just described, the type wheels 249 and 250 are set by the beams 154 to positions corresponding to the keys depressed. These type wheels have characters corresponding to the captions on the keys 40, 41 and 42 (Fig. 1).

The type wheels associated with the first and third rows of keys also have the characters "1GT" and "3GT", respectively to designate the group totalizers.

Secured to the previously described arm 158 (Fig. 3) is a spiral segment 253 meshing with a spiral gear 254 on a shaft 255, which also has fastened thereto a spur segment 256 meshing with the under side of a rack 257. The upper side of this rack meshes with a gear 258 on a sleeve 259, the other end of which carries a gear 260 which meshes with an upper type wheel 261 and with a lower type wheel 262. These type wheels 261 and 262 have characters corresponding to the amounts on the keys 43.

Through this train of gearing just described, the amount beams 154 (Fig. 3) position the amount type wheels 261 and 262 commensurate with the value of the keys 43 depressed.

Connected to the total lever 45 (Fig. 6) is a link 265 pivoted to an arm 266 having secured thereto a spiral segment 267, which meshes with a spiral gear 268 on a shaft 269. Also secured to the shaft 269 is a spur segment 270 (Figs. 6 and 20) meshing with the under side of a rack 271, the upper side of which meshes with a pinion 272 (Fig. 6) fastened on a shaft 273, to the other end of which is secured a gear 274 meshing with an upper type wheel 275 and with a lower type wheel 276. These type wheels 275 and 276 have characters which designate the positions in which the total lever 45 may be set during total, or sub-total or total transfer operations.

By the train of mechanism just described, a movement of the total lever 45 either clockwise or counter-clockwise (Fig. 6) positions the type wheels 275 and 276 so as to print the characters "1X, 2X or 3X" or "1Z, 2Z or 3Z", depending upon the position into which the lever is moved.

*Total, sub-total and total transfer mechanism*

As the tripped transfer devices are not restored to untripped positions before a succeeding operation of the machine, as fully illustrated and described in the Shipley Patent No. 1,619,796, and in order to allow sufficient time for the selection of a totalizer and the engagement of said selected totalizer with the actuating segments 135, when a total or sub-total is to be taken; and when a total transfer operation is to take place, the main cam shaft 30 is given two continuous rotations during these last mentioned operations instead of one, as is the case during an adding operation.

During the first rotation of the cam shaft 30 for a sub-total or read operation, one of the totalizers is moved into engagement with its associated segments 135 and during the second rotation of the shaft 30 the totalizer pinions control the extents of movement of said segments 135, and hence control the setting of the type wheels to print a sub-total on the record strip.

During total transfer operations the totalizer selected to have an amount transferred thereto is engaged with the differential segments 135 during the first rotation of the cam 30, but, since during this operation all of the amount differentials are stopped in the zero positions nothing happens to the totalizer and it is again disengaged just before the end of the first rotation of the shaft 30. On the second rotation of the shaft 30 the totalizer to be cleared is engaged with the segments 135 just before they are moved clockwise (Fig. 3), thus causing the totalizer to be reset to zero, and consequently control the differential settings of said segments 135. Now before these segments 135 are restored to normal positions the totalizer to which the amount is to be transferred, and which was idly engaged during the first rotation of the cam 30, is again engaged with the segments 135 and as the segments 135 are restored to normal positions the amount that was on the totalizer which has been cleared is transferred to the totalizer at this time in engagement with the segments 135.

To permit two rotations of the cam shaft 30 in total, sub-total and total transfer operations, the total lever 45 controls mechanism shown in Fig. 7 to prevent the restoration of the control keys at the end of the first rotation of the shaft 80 and also to prevent the machine from stopping at this time, as is fully illustrated and described in the above mentioned Shipley Patent No. 1,619,796.

Slidably mounted on the stud 35 (Fig. 7) is a link 280, carrying at one end a stud 281 projecting into a slot 282 in the previously described link 97. The other end of the link 280 is pivoted to a lever 283 on the stud 90. Pivoted to the lever 283 is a link 284 also pivoted to an arm 285 secured to a shaft 286.

Also fastened to the shaft 286 is an arm 287 (Fig. 6) carrying a pin 288 projecting into a cam slot 289 in a lever 290 pivoted on a stud 291 carried by the right hand hanger 165 (Fig. 9). Also pivoted on the stud 291 is a lever 292 having a roller 293 engaging a slot 294 in the total lever 45. There is a pin and slot connection 295 between the levers 290 and 292, and the levers are held in the positions shown in Fig. 6 by a compression spring 296.

When the total lever 45 is moved one step either above or below its "add" position, the slot 294 rocks the lever 292 counter-clockwise whereby the spring 296 rocks the lever 290 likewise, which rocks the arm 287 and shaft 286 clockwise. This movement of the shaft 286 rocks the lever 283 clockwise and draws the link 280 to the left (Fig. 7) in the direction of its length.

The link 280 carries two pins 297, engaging on either side of a projection 298 on a slidably mounted coupler 299, normally in the position shown in Fig. 7 during adding operations. The coupler 299 slides in a groove 300 in a cam disc 301 also mounted on the stud 35. This cam disc 301 also sets in a counterbored portion of the gear 34. When the link 280 is moved to the left as previously described, it moves the coupler 299 to the left whereby the small end of the coupler enters a notch 302 in the gear 34, thus connecting the gear 34 and the disc 301, so that they move as a unit.

The link 280 also carries a roller 303 normally resting in a notch 304 offset from a cam race 305 in the disc 301. The movement of the link 280 to the left also moves this roller 303 into the race 305. Consequently, as the disc 301 is turned with the gear 34 the link 280 receives a movement still farther toward the left and then is finally moved to its normal position by the race 305.

The movement of the link 280 to the left rocks the link 97 clockwise with the stud 83 as the pivot. The link 97 is held in this position so that near the end of the first rotation of the shaft 30, when the arm 91 is rocked clockwise by the cam 93, the pin 94 operates in the elongated portion of the slot 96. This allows the link 97 to remain stationary, and consequently the shaft 80 is not rocked to release any depressed key or to stop the machine.

Near the end of the complete rotation of the gear 34 the link 280 is moved back to the position into which it was moved by the total lever 45. When in this position, when the arm 91 is rocked clockwise the second time by the second cam 93, the stud 94 strikes a shoulder 306 in the slot 96 and lowers the link 97 to rock the arm 84 and shaft 80 counter-clockwise slightly past normal position, but not as far past normal position as in adding operations. This movement is sufficient to release any depressed control keys 40, 41 or 42. In adding operations the shaft 80 is rocked farther past normal position than in total and sub-total operations, to release the operated amount keys, but in total and sub-total operations no amount keys are depressed and it is not necessary to rock the shaft 80 as far as when adding. The reason for moving shaft 80 this lesser distance is because a rod 308 (Fig. 3) is in front of lower end of arm 55, and if shaft 80 were given its full movement past normal, this arm 55 would strike the rod 308 and cause the machine to jam. Therefore, the link 97 (Fig. 7), is moved so that the stud 94 cooperates with shoulder 306 during total and sub-total operations in lieu of the shoulder 95.

The shaft 286 has secured thereto a pair of arms 307 (one shown in Fig. 3) which carry the rod 308 located above the arms 62 connected to all of the amount zero stop pawls 65. Movement of shaft 286 by the total lever 45 causes the rod 308 to be moved so that it just touches the arms 62. The parts remain in these positions until the cam 305 (Fig. 7) rocks the shaft 286 still farther in a clockwise direction. This movement of shaft 286 causes rod 308 to move all of the pawls 65 counter-clockwise so that, during the second cycle of shaft 30, the differential actuators 135 may be positioned under control of the totalizer being cleared.

In total taking operations a totalizer selected to be cleared is moved into engagement with the differential segments 135 before said segments are moved clockwise (Fig. 3) by the segments 132 and latches 137, whereby the differential movements of the segments 135 are controlled by the totalizer pinions 180. After the actuators or segments 135 have been moved differentially under the control of the totalizer to be cleared, said totalizer is disengaged from the actuators thereby leaving it at zero.

In read or sub-totalizing operations the totalizer to be read is engaged with the differential actuators 135 before said actuators are moved differentially, and held in engagement therewith to control the differential movement thereof to print a sub-total. The totalizer is also held in engagement with the actuators while said actuators are being restored, thereby accumulating upon the totalizer the amount which was taken therefrom. The mechanism for controlling the engaging and disengaging of the totalizers in total and sub-total operations will be hereinafter described.

In total transfer operations a selected totalizer to be cleared is moved into engagement with the actuators before said actuators are moved by the latches 137 and driving segments 132, whereby the differential movements of the segments 135 are controlled by the totalizer pinions 180. After the actuators have been thus moved differentially the cleared totalizer is disengaged from the actuators and either one or a plurality of other individual totalizer or totalizers is or are engaged with the actuators before they are restored to normal positions. When this is done the amount which was cleared from the first totalizer engaged with the actuators during this total transfer operation, is transferred to either one or a plurality of totalizers, as the case may be, selected to have the amount transferred thereto.

If during a total transfer operation none of the individual totalizers are selected to have the amounts transferred thereto the amount is automatically transferred into a group totalizer.

On the other hand, during a total transfer operation the amount cleared from the first totalizer engaged with the racks may be transferred to a single totalizer selected by the depression of a control key, and also automatically transferred into a group totalizer.

The mechanism whereby a totalizer controls the differential movement of the actuators during a total, sub-total or total transfer operation will now be described.

There is adjacent each of the three totalizer lines a shaft 310 (Fig. 3) having secured thereto an arm 311 (Figs. 11 to 13 and 19) to which is pivoted a link 312 having a pin 313 extending from both sides thereof. Each of these pins 313 enters a slot 314 in the previously described levers 214. These pins 313 normally rest in sections 315 of L-shaped slots in the stationary plate 216.

The pins 313 also normally rest in sections 316 (Figs. 16 and 19) of openings in a totalizer resetting engaging plate 317 pivoted on the rod 104. This plate 317 is moved clockwise, during a read or sub-total operation, during the first cycle of movement of the shaft 30, and held in this position until near the end of the second cycle of the shaft 30. During reset or total operations and also during total transfer operations, the plate 317 is moved clockwise just at the end of the first cycle of movement of the shaft 30 and is returned to its normal position about the middle of the second cycle of movement. The means for changing the time of movement of the plate 317 and also for holding it during sub-total, total and total transfer operations, will be hereinafter described.

The total lever 45 has three slots 320, 321 and 322 (Fig. 17) into which project the pins 213 on the levers 214 associated with the upper, front and back totalizer lines, respectively.

When the total lever is moved to the first position either above or below the "add" position, the pin 213 associated with the upper totalizer line is moved away from the center 104, thus rocking the upper lever 214 (Fig. 8) counter-clockwise. This movement of the lever 214 by the total lever 45, moves the pin 313 of the link 312 associated with the upper totalizer line into a neck 323 (Figs. 16 and 19) of the opening 316 in the plate 317. It also moves the pin 198 on the upper totalizer engaging link 197 into a notch 324 of an opening 325 in the plate 317.

When the total lever 45 is in the first position above or below the "add" position the lower left hand and lower right hand pins 213 (Fig. 17) are not moved. Consequently the levers 214 associated with the front and back totalizer lines are not moved.

When the total lever 45 is moved to the second position above or below "add" position the lower right hand pin 213 is moved by the slot 322, away from the rod 104 and the lower right hand lever 214 (Fig. 8) is moved counter-clockwise to position its pins 313 and 198 in the slot neck 323 and notch 324, respectively, in the plate 317. With the parts in these positions, when the plate 317 is rocked during total, sub-total or total transfer operations the back totalizer line is engaged with the differential segments 135. At this time the lower left hand pin 213 is not moved. The upper pin 213 (Fig. 17) is moved but is again moved back so that it assumes the position shown in Fig. 17.

When the total lever 45 is moved to the third position above or below the "add" position, the lower left hand pin 213 (Fig. 17) is moved away from the rod 104, thus rocking the lower left hand lever 214 (Fig. 8) counter-clockwise so that its pins 313 and 198 are moved into the neck 323 and notch 324 respectively in the plate 317, whereby the front totalizer line is moved into engagement with the differential segments when the plate 317 is rocked in a manner to be hereinafter described. During this operation the upper and the lower right hand pins 213 (Fig. 17) are moved when the high portion of the slots 320 and 322 engage the pins, but are moved back again so that they assume the positions shown in Fig. 17, that is, with relation to the rod 104.

The pins 313 (Fig. 12) not moved by the total lever 45 (Fig. 11) remain in the sections 315 of the L-shaped slots and are thereby kept from being moved by the plate 317 when it is rocked back and forth. The pin 313 moved by the total lever 45, is positioned so that it operates in the section 318 of the L-shaped slots. The sections 318 are concentric with the rod 104.

When the links 312 are shifted in the direction of their lengths one at a time by the plate 317 under the control of the total lever 45, the shafts 310 (Figs. 3 and 4) are oscillated first counter-clockwise and then clockwise to normal position by the links 312. Each shaft 310 has fastened thereto a gear segment 330 meshing with a gear segment 331 integral with an arm 332 pivoted on a stud 333 carried by the hanger 120. The arm 332 engages a pin 334 which connects two links 335 and 336. The link 335 is connected to a lever 337 pivoted at 338 to the hanger 120. This lever 337 carries a flattened pin 339 adapted to cooperate with teeth 340 on the inner side of the previously described reset spider 143. The lever 337 is held in the position shown in Fig. 4 by a spring 341. The link 336 is pivoted to a pawl 342 adapted to cooperate with a long tooth 343 on the totalizer pinion.

The counter-clockwise rocking of the shaft 310 (Fig. 4) by the plate 317 rocks the segment 331 and arm 333 clockwise and causes the links 335 and 336 to be positioned in substantially a straight line, thus rocking the pawl 342 clockwise and positioning it to be engaged by the long tooth 343 when the totalizer pinion reaches its zero position.

The straightening out of the two links 335 occurs during the time the totalizer is being moved into engagement with the differential segments 135. After the totalizer is engaged, the latch mechanism, by means of the segments 132 (Fig. 3), starts the differential segments 135 in a clockwise direction. This rotates the totalizer pinions 180 counter-clockwise (Fig. 4) or in the direction marked "reset". During this movement, when the long tooth 343 strikes the pawl 342, said pawl 342 is rocked counter-clockwise and, since the links 335 and 336 are in substantially a straight line, the lever 337 is rocked clockwise, whereby its pin 339 engages one of the notches 340, thus stopping the rotation of the reset spider 143 and at the same time causing the latch 137 to be disengaged from the segment 132. At this position the totalizer stands at zero, and during a sub-total operation said segments are left in engagement with the segments 135 while it is being restored to normal thus putting back into the totalizer the amount which was taken therefrom and printed.

However, on a total operation after the differential segments have been set under control of the totalizer pinions in the manner just described, the totalizer is disengaged from the segments 135. During the time the cleared totalizer is disengaged from the differential segments 135, the shaft 310 is rocked clockwise to its normal position thus rocking the arm 332 and causing the links 335 and 336 to again assume the position shown in Fig. 4.

*Totalizer engaging control*

Figure 12:
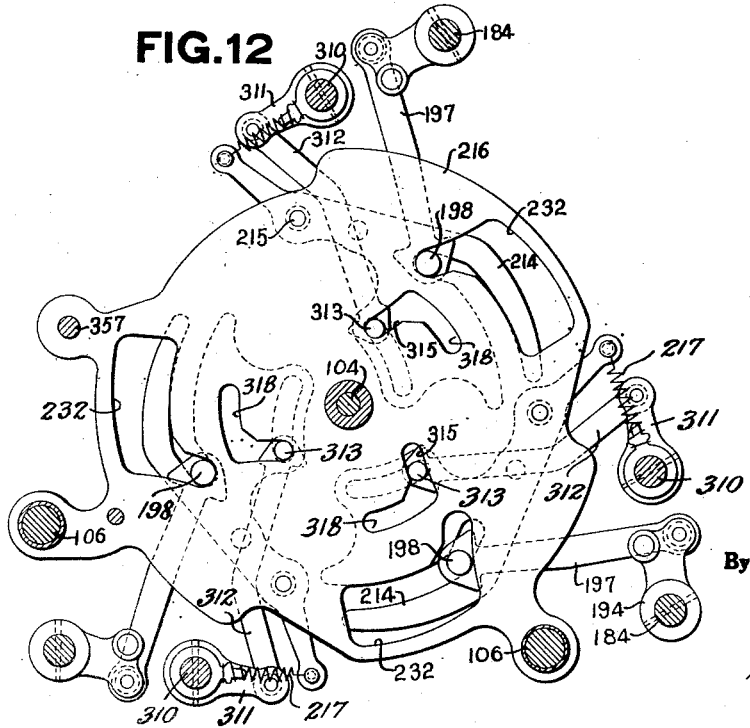
Fig. 12 shows the stationary locking plate and its connection with the totalizer line engaging selecting mechanism.

The mechanism for controlling the movement of the totalizer resetting engaging plate 317 will now be described. The plate 317 (Fig. 16) carries two pins 346 and 347 adapted to cooperate with notches 348 and 349 in a link 350. This link 350 is connected by a hub 351 (Fig. 18) to a link 352 pivoted at 353 to the previously described lever 203 which operates the totalizer adding engaging plate 200. The link 352 has a slot 354 engaging a roller 355 on a lever 356 mounted on a stud 357 on the stationary plate 216 (Fig. 12).

During total, sub-total and total transfer operations the lever 203 (Fig. 16) is oscillated, first clockwise and then counter-clockwise two different times by the cams 204 and 205. This causes the links 350 and 352 to be moved toward the right and back again twice during each of the above mentioned operations.

During a total or reset operation the links 350 and 352 operate as follows:

Just before the end of the first cycle of movement of the shaft 30 and after the links 350 and 352 have been moved idly to the right by the clockwise movement of the lever 203, both of said links are rocked counter-clockwise on the pivot 353, thus causing the notch 349 to engage the pin 347 on the totalizer resetting engaging plate 317. Now, as the lever 203 is rocked counter-clockwise to normal position, near the end of the first cycle of movement of the shaft 30, the link 350 through its engagement with the pin 347, rocks the plate 317 clockwise thus causing one of the totalizer lines, depending upon which one of the pins 198 is in engagement with a notch 324, to be moved into engagement with the differential segments 135.

The parts are held in such positions until the differential mechanism has been set under the control of the totalizer being cleared, after which the lever 203 starts on its second clockwise movement, which moves the links 350 and 352 to the right, thereby rocking the plate 317 counter-clockwise and disengaging the totalizer from the segments or actuators 135. Immediately after this disengagement, the links 350 and 352 are rocked clockwise on the pivot 353, and as the lever 203 is rocked counter-clockwise during the second cycle of the shaft 30, the links 350 and 352 are moved idly to the positions shown in Fig. 16.

During a total transfer operation the movement of the plate 317 is exactly the same as that just described in connection with the total or reset operation. In addition to the movement of this totalizer resetting engaging plate, the totalizer adding engaging plate 200 (Fig. 14) is given two oscillations by the lever 203 which lever is the common operating means for the two plates 200 and 317.

The totalizer, selected under the control of the depressed key, to have the total transferred thereto has its pin 198 moved into the offset fork 199 on the plate 200. During the first cycle of movement of the shaft 30 the plate 200 is rocked clockwise and then counter-clockwise to engage the totalizer with and disengage it from the actuators. However, this engagement and disengagement are merely idle movements, because during this first cycle it will be recalled that the differential latches 137 are all disconnected from the driving segments 132 at the zero positions, and consequently there can be no movement of the totalizer wheels at this time. However, during the second cycle of movement of the shaft 30 the plate 200 is again oscillated (Fig. 14) by the lever 203. This second clockwise movement of the plate 200 takes place at the same time that the plate 317 is being moved counter-clockwise. The movement of the plate 200 is used to engage the totalizer, selected to have the total transferred thereto, with the differential actuators 135, and the movement of the plate 317 at this time is used to disengage the cleared totalizer from the differential actuators 135. The plate 317 operates the totalizer being cleared or reset to zero, and the plate 200 operates the totalizer or totalizers into which the total is to be transferred.

The plate 200 is held in this rocked position during the second cycle of movement of the shaft 30 until after the actuators 135 have been restored to normal positions thus causing the amount cleared from one totalizer to be entered into the totalizer or totalizers engaged with the actuators by this plate 200.

Figure 21:
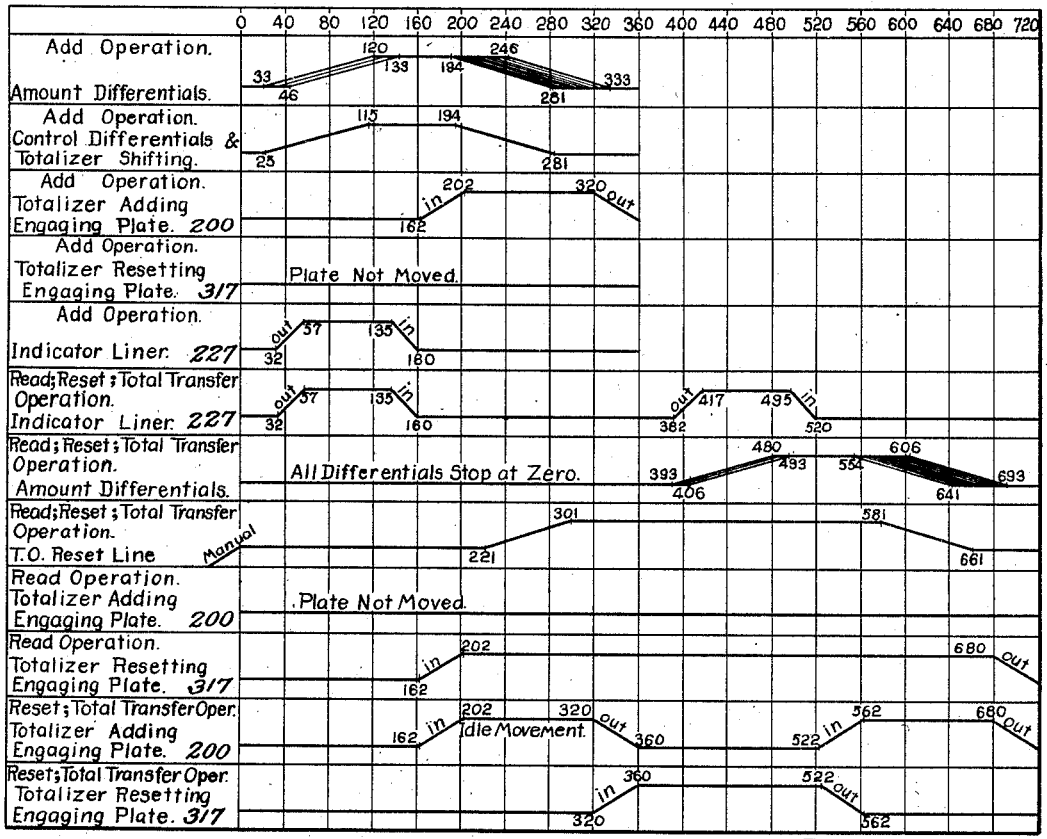
Fig. 21 is a time chart illustrating graphically the timing of certain of the cams.

The timing of the movement of the plate 317 during reset and total transfer operations is shown in the time chart in Fig. 21 opposite the title "Reset—Total transfer operation—Totalizer resetting engaging plate". The timing of the movement of the plate 200 is shown in this time chart opposite the title "Reset—Total transfer operation—Totalizer adding engaging plate".

During a read or sub-total operation the plate 317 is rocked clockwise during the first cycle of movement of the shaft 30, and held in this position until near the end of the second cycle.

During a reading operation, before the lever 203 has been moved clockwise, the links 350 and 352 are rocked clockwise on the pivot 353 thus causing the notch 348 to engage the pin 346.

With the parts in these positions the first clockwise movement of the lever 203 rocks the plate 317 clockwise, thus causing one of the totalizer lines, depending upon which pin 198 is in a notch 324, to be engaged with the differential actuators 135. At the end of the clockwise movement of the lever 203 the links 350 and 352 are rocked counter-clockwise, thus disengaging the notch 348 from the pin 346, so that upon the counter-clockwise movement of the lever 203 the links 350 and 352 are moved toward the left idly. During the second clockwise movement of the lever 203 the links 350 and 352 are again moved to the right idly, and before the second counter-clockwise movement of the lever 203 these links 350 and 352 are again rocked clockwise on the pivot 353, thus again engaging the notch 348 with the pin 346, so that upon the second counter-clockwise movement of the lever 203, the plate 317 is rocked counter-clockwise thus disengaging the totalizer from the actuators. The timing for the movements of the plate 317 just described, is shown in the time chart (Fig. 21) opposite the heading "Read operation—Totalizer resetting engaging plate".

During the back and forth movement of the links 350 and 352 they are supported at their left hand ends (Fig. 16) by the roller 355. Both of the links 350 and 352 have an opening 358 to allow sufficient play about the rod 104.

During a read or sub-total operation, since there is to be no transfer of totals from one totalizer to another, the means which operates the totalizer adding engaging plate 200 during adding operations and also during total taking and total transfer operations, is rendered ineffective.

The previously described link 201 (Fig. 14) has a slot 361 engaging a roller 362 on a lever 363, pivoted on the stud 357. The lever 363 also carries a roller 364 normally projecting into a section 365 of a slot in the total lever 45. As previously stated, for a reset or total transfer operation the total lever is moved downwardly or counter-clockwise one, two or three steps. During this movement the roller 364 rides in this section 365 of the total lever slot, and as said section is concentric with the rod 104, there will be no movement of the lever 363. However, when the total lever is moved upwardly or clockwise to any one of its three positions the roller 364 is moved into a section 366 of the slot consequently rocking the lever 363 counter-clockwise, which through its rollers 362 rocks the link 201 clockwise thus disengaging it from the pin 202 on the totalizer adding plate 200. When the link 201 is thus disengaged, its movement by the lever 203 is ineffective.

The mechanism for causing the links 350 and 352 to be moved so as to engage either the pin 346 or the pin 347, will now be described.

The lever 363 has a slot 370 (Figs. 13, 14 and 16) into which projects a stud 371 on a link 372 pivoted to the previously described arm 287. The stud 371 also projects into a substantially vertical portion of a slot 373 in the lever 356.

As previously described, whenever the total lever 45 is moved either up or down from its adding position the levers 290 and 292 (Fig. 6) rock the arm 287 to couple the cam disc 301 (Fig. 7) with the driving gear 34. During this clockwise movement of the arm 287 the stud 371 remains in the substantially vertical portion of the slot 373.

However, when the shaft 286 and arm 287 are given a further clockwise movement by the cam race 305, during a total or reset operation, the stud 371 (Figs. 6, 13 and 16), engages the cam portion of the slot 373 in the lever 356, and since the lever 363 is held stationary by the section 365 of the slot in the total lever 45, the stud 371 must necessarily follow the slot 370 in this lever 363, and this causes the lever 356 to be rocked clockwise about the stud 357. This clockwise movement of the lever 356 takes place after the lever 203 has been rocked clockwise during the first cycle of the shaft 30. Consequently, at this time the slot 349 in the link 350 is directly above the pin 347 on the plate 317. Therefore, this clockwise rocking of the lever 356 causes the notch 349 to engage the pin 347 so that when the lever 203 is rocked counter-clockwise near the end of the first cycle of the shaft 30, the plate 317 is rocked clockwise to engage a totalizer on the selected totalizer line with the differential actuators 135. Upon the second clockwise movement of the lever 203 during the second cycle of the shaft 30, the links 350 and 352 are moved to the right and the plate 317 restored to its normal position thereby disengaging the totalizer from the actuators. After this disengagement takes place, the cam 305 (Fig. 7) rocks the shaft 286 and arm 287 counter-clockwise to normal positions, thus causing the stud 271 to again be moved into the substantially vertical portion of the slot 373, consequently rocking the lever 356 counter-clockwise to its normal position.

The timing for the cam 305 is found in the time chart (Fig. 21) opposite the title "Read—Reset—Total transfer operation—T. O. reset line".

The levers 356 and 363 and links 350 and 352 have identically the same movements during a total transfer operation.

During a reading or sub-total operation, when the total lever 45 is moved upwardly or clockwise (Figs. 6, 13 and 16), it will be remembered that the lever 363 is immediately moved in a counter-clockwise direction. When this occurs the lever 356 is also immediately moved in a counter-clockwise direction by the stud 371. This movement causes the notch 348 to immediately engage the pin 346 on the plate 317, so that when the lever 203 is rocked clockwise during the first cycle of the shaft 30, the plate 317 is also moved clockwise to engage a totalizer on the selected totalizer line with the differential segments 135.

After this clockwise movement of the lever 203 and plate 317, the cam 305 (Fig. 7) rocks the shaft 286 and arm 287 clockwise, thus drawing the link 372 downwardly. This causes the stud 371 to engage the cam portion of the slot 373 thus rocking the lever 356 clockwise which rocks the links 350 and 352 counter-clockwise and disengages the notch 348 from the pin 346. Now as the lever 203 is rocked counter-clockwise during the first cycle of the shaft 30 the links 350 and 352 are moved to the left idly, thus permitting the plate 317 to remain in the position to which it has been set, whereby the totalizer on the selected totalizer line is left in engagement with the differential segments 135. Upon the second clockwise movement of the lever 203 during the second cycle of the shaft 30 the links 350 and 352 are again moved toward the right (Figs. 13 and 16) idly. After they have reached the limit of their movement toward the right, the cam 305 (Fig. 7) restores the shaft 286 and arm 287 to their normal positions thus raising the link 372 and causing the stud 371 to rock the lever 356 counter-clockwise, which rocks the links 350 and 352 clockwise on the pivot 353 and engages the notch 348 with the pin 346 on the plate 317. Then as the lever 203 is rocked counter-clockwise the second time, the plate 317 is rocked counter-clockwise to its normal position, thus disengaging the totalizer from the differential actuators.

The timing for these last movements of plate 317 is opposite the heading "Read operation—Totalizer resetting engaging plate" (Fig. 21).

The plate 317 is held against movement from its normal position by means of a pin 375 (Figs. 13 and 16) engaging a notch 376 in said plate. This pin is carried by a lever 377 pivoted at 378. The upper end of the lever carries a roller 379 entering a cam slot 380 in the previously described lever 356.

During adding operations the lever 356 is never moved, and therefore, the plate 317 is locked against movement. However, during a sub-total, total or total transfer operation, the movement of the lever 356 either clockwise or counter-clockwise rocks the lever 377 and disengages the pin 375 from the notch 376 to allow said plate 317 to be moved.

When the plate 317 has been rocked clockwise during a read operation, it will be remembered that it is left in this position because the notch 348 is disengaged from the pin 346. When this disengagement occurs the lever 377 is rocked so that the pin 375 engages a notch 381 in the plate 317 to maintain said plate in its moved position. When the slot 348 is again engaged with the pin 346 the lever 377 is rocked to disengage the pin 375 from the notch 381 thus permitting the plate 317 to be restored to its normal position. After the plate 317 assumes this normal position, and when the lever 356 is moved to its normal position the second time during the reading operation, the pin 375 again engages the notch 376, thus locking the plate 317 in its normal position.

Whenever either of the totalizer engaging plates 200 or 317 is moved out of its normal position, it is essential that the total lever 45 be locked against movement. To accomplish this the plate 200 has a projecting cam 382 (Figs. 13 and 17) and the plate 317 has a cam 383.

Both of these cams contact a pin 384 on an arm 385 integral with the previously described arm 115 (Fig. 17). When either of the plates 200 or 317 is rocked clockwise the cam 382 or the cam 383, as the case may be, rocks the arm 385 clockwise, thus causing the lug 116 on the arm 115 to enter in one of the notches 117, depending upon the position in which the totalizer lever 45 is set.

*Printing of group total designating characters during total, sub-total or total transfer operations*

As is customary in machines of the type illustrated and described in the Shipley Patent No. 1,619,796, the type wheels 249 and 250 (Figs. 2, 22 and 24) normally do not carry type at the printing line. In the position below the blank position, the wheels 249 and 250 associated with the first row of keys 40 carry the characters "1GT". In the position below the blank position on the type wheels 249 and 250 associated with the third row of keys 42, the type wheels carry the characters "3GT".

Therefore, in order to print these characters "1GT" and "3GT", it is necessary to move the rack 244 associated with the first and third rows of keys 40 and 42 respectively, one step to the left from the position shown in Fig. 22.

In order to accomplish this applicant has utilized mechanism known in the art as "zero eliminating mechanism", which mechanism is fully illustrated and described in the above mentioned Shipley Patent No. 1,619,796. The zero elimination mechanism is that which moves all of the type wheels to the left of the highest digit, to carry the zeros out of printing position and present blank spaces on these wheels to the printing line.

The difference between the zero elimination in the above mentioned Shipley patent and the elimination feature in this application, is that in the patent referred to the elimination feature is used for the purpose of presenting blank spaces to the printing line so that no printing will take place, whereas in the present application it is used for the purpose of presenting the characters "1GT" (Fig. 24) and "3GT" to the printing line, so that they will be printed.

In Fig. 24 the type wheel has been "flattened out" to show the twelve positions on the wheel. The numbers at the side correspond to the numbers on the keys in Fig. 1.

Each of the racks 244 has on its left hand end a shoulder 390 (Fig. 22) adapted to cooperate with a shoulder 391 on a lever 392, pivoted at 393 to an arm 394 loose on a shaft 389, which shaft is supported by the printer framework (not shown).

Connected to the lever 394 is a link 395, pivoted to a bell crank 396 loosely mounted on a shaft 397, also supported by the printer framework. This bell crank carries two rollers 398 and 399 which cooperate with a pair of cams 400 and 401 mounted on a printer drive shaft 402. This shaft is given one rotation in a counter-clockwise direction every operation of the machine by mechanism which is not shown nor described in this application, but which is fully shown and described in the above mentioned Shipley Patent No. 1,619,796. This rotation of the shaft 402 through the bell crank 396 and link 395 rocks the lever 394 first clockwise and then counter-clockwise. The clockwise movement of the lever 394 will, if a rack has not been adjusted differentially under control of the keys but is left in its zero position, under the control of the zero stop pawl, move the lever 392 and the rack 244 toward the left a distance sufficient to rotate the type wheels 249 and 250 one space, thereby positioning the characters "1GT" or "3GT" so that an impression may be taken therefrom. The racks 244 are normally held in their right-hand positions by spring pulled levers 404 loose on a shaft 405, which levers have noses cooperating with projections 406 on the racks 244.

It is apparent from Fig. 22 that if the lever 392 is in the position shown, the clockwise movement of the lever 394 will have no effect on the rack because the lever 392 is normally held in its elevated position by an arm 408 loose on a rod 409. A spring 407 holds the lever 392 against the arm 408. There are three of these arms 408, each of which has a projection 410.

The arm 408 associated with the rack 244 for the keys 40 cooperates with a cam disc 411; the arm 408 associated with the rack 244 for the second row of keys 41 cooperates with a cam disc 412; and the arm 408 associated with the rack 244 for the third row of keys 42 cooperates with a cam disc 413. These cam discs are all secured to a gear segment 414 which meshes with a rack 415 (Fig. 20) on the previously described total lever rack 271.

The center cam disc 412 and arm 408 could be omitted from this machine since there is no totalizer in the zero position on the back totalizer line in the machine illustrated as the system described does not require any. Other systems may require one, therefore it was thought best to show this cam disc 412.

It will be remembered that this rack 271 is moved one, two or three steps in either direction by movement of the total lever 45, depending upon the position into which it is moved. All three cam discs 411, 412 and 413 have a high spot normally underlying each of the projections 410 on the arms 408. The cam disc 411 has low spots in the first, second and third positions on the left or reset side of normal position and on the right or read side of normal it has a low spot in the first and second positions and a high spot in the third position. The cam disc 412 has high spots on the first, second and third positions on both sides of the normal position. The cam disc 413 has high spots on the first and second positions on each side of the normal positions and low spots in the third positions of the cam disc on each side of the normal position. These positions are marked in Fig. 20, as follows: "normal", "1st", "2nd", "3rd".

From the above description it will be clear that, when the total lever is moved to the first position either above or below the "add" position, the arm 408 associated with the first row of keys 40, is permitted to drop to the low spot on the cam disc 411. The arm 408 associated with the second row of keys is held in the position shown in Fig. 22, that is, it rests against the high spot in the first position on the cam disc 412. The arm 408 associated with the third row of keys is held up by the high spot opposite the first position on the cam disc 413.

With the arms 408 in the positions just described, the only arm 408 which will be opposite a low spot on the cam discs 411, 412 and 413 is the arm 408 for the first row of keys. This permits only the lever 392 associated with this row of keys to be lowered by its spring 407. Consequently, when the lever 394 is rocked as previously described, only the rack 244 associated with the first row of keys 40 is moved to the left, thereby only the character "1GT" is printed.

When the total lever is moved either up or down to the second position, the three discs 411, 412 and 413 are moved to their second positions. In this case the disc 411 has a low spot in the second position, therefore the arm 408 associated with the first row of keys is lowered; the disc 412 for the second row of keys has a high spot in the second position, therefore, the arm 408 is held up and the disc 413 for the third row of keys has a high spot in the second position, therefore, this arm is held up. Consequently, only the character "1GT" is printed.

When the total lever is moved to the third position below its add position, both the characters "1GT" and "3GT" are printed because this time all three discs are moved to the third positions. In this case the first cam disc 411 has a low spot in the third position and the arm 408 for the first bank of keys is lowered. The second cam disc 412 has a high spot in the third position, therefore, this arm 408 is held up, but the cam disc 413 has a low spot in the third position, therefore, the arm 408 for the third bank is lowered. This permits the first and third levers 392 to draw the first and third racks 244 to the left to position the type carriers "1GT" and "3GT" for printing.

When the total lever is moved to the third position above its add position, the character 3GT, only will be printed because the cam disc 411 has a high spot in the third position on its "read" side while the cam disc 413 has a low spot. The high spot on cam disc 411 prevents 1GT from being printed and the low spot on cam disc 413 permits 3GT to be printed.

*Detail strip*

The printing accomplished by the machine described in this application during adding operations, read or sub-total operations, reset or total taking operations, and total transfer operations, is illustrated by a portion of a detail strip shown by Fig. 23.

In the present application there is no mechanism shown for feeding or shifting the detail strip, nor for causing the impressions to be made from the type wheels. The feeding and shifting of the detail strip, and the printing thereon may be effected in exactly the same manner in which they are done by the machine illustrated in the Shipley Patent No. 1,619,796.

The first seventeen printed items, as designated by the consecutive numbers printed at the left hand side of the sheet (Fig. 23), represent various sales that have been made, and show the amounts entered into the various totalizers indicated, during adding operations. The characters in the three center columns correspond to the characters on the keys 40, 41 and 42 and thus indicate which keys were depressed and which totalizers were selected during these seventeen operations.

The rest of the printing on the detail strip illustrates the results obtained when an analysis is made of the business.

To obtain such an analysis as is indicated here, it is necessary to put the machine through total transfer operations; certain reset or total operations and certain read or sub-total operations.

Referring now particularly to the designations printed on the detail strip during the analysis of the business, which designations appear below the first seventeen printed items. The left hand column of figures which shows "00017" represents the consecutive number of the last item entered into the machine.

It might be well to state here that whenever the total lever 45 is moved out of adding position, the consecutive number feeding mechanism is rendered ineffective, as is fully illustrated and described in the above mentioned Shipley Patent No. 1,619,796.

The next column of printing which begins with the characters "3Z" is printed by the type wheel controlled directly by movement of the total lever 45, and these characters represent the positions in which the total lever is set for the various operations.

The next column of characters beginning with "1GT" designates the various totalizers on the upper totalizer line. This column of characters is printed under control of the rack 244 associated with the first row of keys 40. The characters in the next column which begins with "—" designate the various totalizers on the back totalizer line and are printed under control of the rack 244 associated with the second row of keys 41. The column beginning with the characters "3GT" represents the totalizers on the front totalizer line. The characters in this column are printed under control of the rack 244 associated with the third row of keys 42. The last or right hand column of printing designates the amounts as they are taken from the various totalizers.

It will be recalled from the prior description that during adding operations all of the amounts which are entered into the totalizers associated with the first row of keys 40 are also entered into the third group totalizer 3GT, which is in the zero position on the front totalizer line; and that all amounts entered into the totalizers associated with the second and third rows of keys 41 and 42 except the "asterisk" key, are entered into the first group totalizer 1GT in the zero position on the upper totalizer line.

The first operation necessary for a complete analysis of the business after the entry of the seventeenth transaction shown, is designated by the line of printing 420. "3Z" shows that the total lever 45 was moved to the third position below add. This selected the front line of totalizers for actuation and since no key was depressed, the third group totalizer, as indicated by the characters "3GT", was selected to be cleared. The characters "1GT" show that the amount cleared from the third group totalizer was transferred to the first group totalizer. The figures at the right "84.00" show the total taken from the third group totalizer, which represents the total amount received from the sales of shoes and slippers.

The next line of printing 421 shows that the total lever was moved to the first position below add as designated by "1Z" and since no keys were depressed, as represented by the characters "1GT", the first group totalizer was cleared and the amount "131.75" printed which represents the sum of the two group totalizers "1GT" and "3GT" or the grand total of all business. The first and third group totalizers are clear and the machine is now in condition for further analysis of the business.

The next two lines of printing 422 show that the total lever was moved to the third position below add, that the repairs and finding keys were depressed as indicated by the characters "R", "F", and that the amounts cleared from these two totalizers were transferred into the first group totalizer, as shown by "1GT".

In the next line of printing 423 "1Z" indicates that the total lever was moved to the first position below add and the first group totalizer cleared, showing a total of "2.95", the total amount received for repairs and findings.

The next two lines of printing 424 show, that the total lever was moved to the third position below the add; as shown by "3Z", and the womens and girls galoshes totalizers were cleared, as shown by "WG", "GG", and that the amounts "9.00" and "3.80" respectively were transferred to the first group totalizer, as indicated by "1GT".

The next line of printing 425 shows that the first group totalizer was cleared, and that the amount "12.80" is the total amount of all of the galoshes sold.

In the next five lines of printing 426 "3Z" indicates that the total lever was set in the third position below add, and the mens, womens, boys, girls and infants rubbers totalizers, as designated by the characters "MR, WR, BR, GR, IR", were cleared and the amounts which were on these various totalizers were all transferred to the first group totalizer, as indicated by the series "1GT".

The next line of printing 427 shows that the first group totalizer was again cleared showing "5.50", the total amount taken in for the sales of rubbers.

Now, all of the totalizers on the front line, associated with the third row of keys 42 have been cleared, therefore, any of the totalizers on this line are now available to have other amounts transferred thereinto from other totalizers, which have not yet been cleared.

The next four lines of printing 428 show that the total lever was set to the second position below add as indicated by "2Z". They also show that the mens, boys and womens boots and also the "asterisk" totalizers were cleared as designated by the characters "MB, BB, WB and *". These lines of printing also indicate that, as the various boots totalizers were cleared the amounts were transferred into the mens rubbers totalizer as shown by the three characters "MR" and also were transferred into the first group totalizer as indicated by the three characters "1GT". The amount on the "asterisk" totalizer, in this case 0.00, was not transferred into any other totalizer, since, as previously stated, this "asterisk" totalizer is used to accumulate or list miscellaneous amounts.

The next line of printing 429 shows that the total lever was moved to the first position above add, as indicated by the characters "1X". The amount "18.00" is the total of the amounts received from the sales of boots. Since the total lever was moved to the position above adding or the "read" position, this amount "18.00" was put back into the first group totalizer for further use to complete the analysis.

The next five lines of printing 430 show that the total lever was moved to the first position below add, as shown by "1Z". These lines also indicate that the men's, women's, boys', girls' and infants' shoes totalizers were cleared one after the other as designated by the characters "MSH, WSH, BSH, GSH, ISH". The amounts from these various totalizers, as indicated by "WB" and "F" were transferred into the women's boots totalizer and the findings totalizer.

The next line of printing 431 shows that the total lever was moved to the third position below add, as indicated by "3Z" and that the findings totalizer was cleared. This line shows, also, that the amount in the findings totalizer was transferred to the first group totalizer "1GT". The amount "80.50" shows the total of the amount received from the sales of shoes. The 1GT totalizer now has in it 98.50 or the total of all of the boots and shoes totalizers.

The next four lines of printing 432 show that the total lever was moved to the first position below add, as indicated by the characters "1Z". The characters "MSL, WSL, BSL and GSL" show that the men's, women's, boys' and girls' slippers totalizers were cleared one after the other and that the amounts from these totalizers were transferred into the women's boots and findings totalizers, as indicated by "WB" and "F".

The next line of printing 433 shows that the total lever was moved to the "3Z" position and that the "findings" totalizer was again cleared and the amount therefrom transferred into the "1GT" totalizer. The amount "3.50" represents the amount received from the sales of slippers.

The first group totalizer now has in it the amount of money received from the sales of boots and shoes and slippers.

The next line of printing 434 shows that the total lever was moved to the "1Z" position and the first group totalizer "1GT" cleared, showing an amount of "102.00", which is the total amount received from the sales of boots, shoes and slippers.

The women's boots "WB" totalizer now has in it "84.00", which amount was transferred thereinto from the shoes and slippers totalizers. The men's rubbers "MR" totalizer still has in it 18.00 which was transferred thereto from all the boots totalizers.

The next five lines of printing 435 show that the total lever was moved to the second position below add, as indicated by "2Z". These lines of printing also indicate that the men's, women's, boys', girls' and infants' hose totalizers, as shown by the characters "MH, WH, BH, GH and IH" were cleared, and these amounts transferred into the men's rubbers totalizer and the first group totalizer, as designated by the characters "MR" and "1GT". The "MR" totalizer now has in it 26.50, total from sales of boots and hose.

The next line of printing 436 shows that the total lever was again moved to the first position above add, as indicated by "1X" and that a read or sub-total operation was made from the first group totalizer showing an amount of "8.50", the total amount taken in from the sales of hose. This amount "8.50" is retained in the first group totalizer.

The next line of printing 437 indicates that the total lever was moved to the second position below the add as designated by "2Z" and that the women's boots totalizer "WB" was cleared. It will be remembered that this totalizer had in it "84.00", the total amount of money received from the sales of shoes and slippers. This amount was transferred by this operation into the first group totalizer which had 8.50 in it, thus making the total in 1GT, 92.50. The 84.00 was also transferred into the men's rubbers "MR" totalizer and the amount "84.00" printed. The "MR" totalizer now has in it 110.50.

In the next line of printing 438 "1Z" indicates that the total lever was moved to the first position below add, and that the first group totalizer "1GT" was cleared, showing an amount of "92.50" which amount is the total of money taken in from the sales of shoes, slippers and hose.

In the next line of printing 439, "3Z" shows that the total lever was moved to the third position below add, the "MR" totalizer cleared and the amount transferred into the first group totalizer. The amount taken from the "MR" totalizer and printed is "110.50", the total amount of money received from the sales of shoes, slippers, hose and boots.

The last line of printing 440 shows that the totalizer lever was moved to the first position below add and the first group totalizer "1GT" cleared, this being the same amount "110.50" which was transferred into it from the "MR" totalizer.

The analysis is now completed and the machine stands cleared ready for more items to be entered into it.

Operation

A very brief description of an adding operation will be now given. Let it be assumed that $23.00 worth of men's shoes were sold. The operator depresses the amount keys 43 to represent $23.00. The top key 40 in the first row is then depressed (Fig. ,) to select the men's shoes totalizer. As the machine starts, the differential segments 135 are moved differentially under the control of the depressed amount keys 43. During this time the differential arm 164 (Fig. 2) associated with the first row of keys is moved to the ninth position. The beam 154 and arm 170 are also set in the ninth position, thus rotating the totalizer selecting plate 210 (Fig. 1) to the ninth position.

Since no keys are depressed in the second and third rows of control keys, the totalizer selecting plates 211 and 212 remain set in their zero positions. As the plate 211 for the second row has a high spot in the zero position opposite the pin 213 associated with the upper totalizer line, which carries the men's shoes totalizer, this upper line is selected. During the differential movement of the arm 164 this upper line is shifted by cam 191 (Fig. 5) to select the men's shoes totalizer "MR" so that it will be in alignment with the differential segments 135. After this selection has been made, the totalizer adding engaging plate 200 (Fig. 14) is rocked clockwise thus engaging the "MR" totalizer with the differential segments or actuators 135.

Since there is a high spot in the "9" position on the plate 210 for the first row of keys opposite the pin 213 associated with the front totalizer line, this totalizer line is also engaged with the differential actuators by the totalizer adding engaging plate 200. As no keys were depressed in the third row, the front totalizer line is left in its zero position and the third group totalizer "3GT" is engaged with the differential actuators so that the amount which is entered upon the men's shoes totalizer, as the differential actuators are restored to normal positions, is also entered into the third group totalizer. During this operation the type wheels are set to print as indicated by the top line of printing on the detail strip in Fig. 23, "MSH" indicating men's shoes totalizer and "23.00", representing the amount of the sale.

After the amount has been entered into the selected totalizers, the totalizer adding engaging plate 200 (Fig. 14) is rocked counter-clockwise thus disengaging the totalizers from the actuators.

Suppose that it is now desired to transfer the amount from the men's shoes totalizer into the women's boots and also the findings totalizers during an analysis of the machine. Such an operation will now be described.

First, the total lever 45 is moved to the first position below add, to select the upper totalizer line for engagement. Then the "MSH" key is depressed to select the men's shoes totalizer on this line. Next, the keys "WB" and "F" are depressed, to select the women's boots and findings totalizers on the back and front totalizer lines respectively.

The differential arms 164 controlled by the "WB" and "F" keys cause the cams 191 to select the totalizers indicated by the keys depressed. During this operation the shaft 30 goes through two cycles of movement.

The movement of the total lever 45 to the first position below add causes the slot 320 (Fig. 17) therein to rock the upper lever 214 (Fig. 11) counter-clockwise thus causing the associated pin 198 to move into the notch 324 of the totalizer resetting engaging plate 317 (Figs. 13, 16 and 19).

Since the "WB" and "F" keys 41 and 42 respectively are both in the second positions, the plates 211 and 212 (Fig. 1) are moved to the second positions by the differential mechanism associated with the second and third rows of keys. As there is a high spot on the plate 211 in the second position opposite the pin 213 associated with the back totalizer line, and since there is a high spot in the second postion on the plate 212 opposite the pin 213 associated with the front totalizer line, the lower and left hand levers 214 (Figs. 8 and 11) are rocked by their springs 217 until their pins 213 strike these high spots. This causes the pins 198 on the back and front totalizer engaging links 196 to move into the forks 199 on the adding engaging plate 200 (Fig. 14).

During the first cycle of movement of the shaft 30 both the front and back totalizer lines are rocked into engagement with the differential actuators, but as the actuators, during this cycle of movement, are stopped in the zero positions (Fig. 21) nothing happens to the totalizers and this engagement will be merely an idle one.

Near the end of the first cycle of movement the resetting engaging plate 317 rocks the upper totalizer line into engagement with the actuators before they start on their clockwise movement (Fig. 3). The "MSH" totalizer on the upper line will be reset to zero and control the actuating mechanism to stop, according to the amount which was taken from this totalizer. After this occurs and before the actuators are restored to normal positions the adding engaging plate 200 is rocked clockwise (Fig. 14) and engages the back and front totalizer lines with these differential actuators, now setting in the positions according to the amount which was taken from the "MSH" totalizer. The segments 135 are then restored to normal positions, thus transferring to the "WB" and "F" totalizers on the back and front lines respectively, the amount which was taken from the "MSH" totalizer on the upper line. After this restoration of the segments 135 the front and back lines are disengaged from the segments. The upper line is disengaged before the segments 135 are restored to normal positions thus leaving the "MSH" totalizer at zero.

The printing mechanism is controlled during this operation to print as is indicated by the top line of characters 430 on the detail strip in Fig. 23. The character "1Z" indicates that the total lever was set to the first position below add, "MSH" indicates that the men's shoes totalizer was cleared, and the characters "WB" and "F" indicate that the amount $33.00 cleared from the mens shoes totalizer was transferred into the womens boots and findings totalizers.

During a transfer total operation when there is no totalizer selected, by the depression of a key, into which the amount is to be transferred, the amount is automatically transferred into either one of the two group totalizers "1GT" or "3GT" depending upon which of the totalizer lines is being operated to have a totalizer thereon cleared. In other words if an amount is to be transferred from the mens shoes totalizer, if none of the keys in the second and third rows are depressed then the third group totalizer is selected because both of plates 211 and 212 remain in their zero positions and the plate 210 moves to its nine position. Because of the high spot in this nine position opposite the pin 213 associated with the front totalizer line, this totalizer line is engaged with the differential actuators and since no keys are depressed the totalizer in the zero position, namely the third group totalizer, is engaged with the actuators in exactly the same manner and at exactly the same time as were the "WB" and "F" totalizers as above described.

While the forms of mechanisms herein shown and described are admirably adapted to fulfill the objects primarily stated, it is to be understood that it is not intended to confine the invention to the forms or embodiment herein disclosed, for it is susceptible of embodiment in various forms all coming within the scope of the claims which follow.

What is claimed is:

1. In a machine of the class described, the combination of a plurality of groups of totalizers, means for transferring the total from any totalizer of one group of any totalizer of another group, and keys for selecting both totalizers before an operation is begun.

2. In a machine of the class described, the combination of a plurality of groups of totalizers, means for transferring the total from any totalizer of one group to any totalizer of another group, and a differentially adjustable element for selecting the group from which one totalizer is to be selected.

3. In a machine of the class described, the combination of a plurality of groups of totalizers, actuating means common to all totalizers of all groups, adapted to be moved in one direction to accumulate upon the totalizers and in another direction to restore the totalizers to zero, means common to all totalizers for engaging any totalizer of one group with the actuating means prior to the travel of said actuating means in one direction, means common to all totalizers for engaging any totalizer of another group with the actuating means prior to the travel of said actuating means in the other direction, and means for selecting the totalizers as desired.

4. In a machine of the class described, the combination of a plurality of groups of totalizers, actuating means common to all totalizers of all groups, adapted to be moved in one direction to accumulate upon the totalizers and in another direction to restore the totalizers to zero, means common to all totalizers for engaging any totalizer of one group with the actuating means prior to the travel of said actuating means in one direction, means common to all totalizers for engaging any totalizer of another group with the actuating means prior to the travel of said actuating means in the other direction, and a differentially adjustable element and a plurality of keys to select the desired totalizers.

5. In a machine of the class described, the combination of a plurality of totalizers, actuating means common to all totalizers and adapted to be moved in one direction to accumulate upon the totalizers, and in another direction to restore the totalizers to zero, a plurality of totalizer engaging elements, one of which engages a totalizer with the actuating means prior to the accumulating movement thereof, and another of which engages a totalizer with the actuating means prior to the restoring movement thereof, common operating means for said engaging elements, means for determining which totalizer shall cooperate with said one element, and means for determining which totalizer shall cooperate with another of said elements.

6. In a machine of the class described, the combination of a plurality of totalizers, actuating means common to all totalizers and adapted to be moved in one direction to accumulate upon the totalizers, and in another direction to restore the totalizers to zero, a plurality of totalizer engaging elements, a certain one of which engages the totalizer with the actuating means prior to the accumulating movement thereof, and another of which engages a totalizer with the actuating means prior to the restoring movement thereof, common operating means for said engaging elements, means intermediate the common operating means and said certain one element for driving said element upon operation of operating means, means intermediate of the common operating means and another of said elements for driving said element upon operation of said operating means, means for determining which totalizer shall cooperate with said certain one element, and means for determining which totalizer shall cooperate with another of said elements.

7. In a machine of the class described, the combination of a plurality of totalizers, actuating means common to all totalizers and adapted to be moved in one direction to accumulate upon the totalizers, and in another direction to restore the totalizers to zero, a plurality of totalizer engaging elements, one of which engages a totalizer with the actuating means prior to the accumulating movement thereof, and another of which engages a totalizer with the actuating means prior to the restoring movement thereof, common operating means for said engaging elements, means intermediate the common operating means and said one element for driving said element upon operation of the operating means, means intermediate the common operating means and another of said elements for driving said element upon operation of the said operating means, and means for disconnecting the first intermediate means from said one engaging element.

8. In a machine of the class described, the combination of a plurality of totalizers, actuating means common to all totalizers and adapted to be moved in one direction to accumulate upon the totalizers, and in another direction to restore the totalizers to zero, a plurality of totalizer engaging elements, a certain one of which engages a totalizer with the actuating means prior to the accumulating movement thereof, and another of which engages a totalizer with the actuating means prior to the restoring movement thereof, common operating means for said engaging elements, means intermediate the common operating means and said certain one element for driving said element upon operation of the operating means, means intermediate the common operating means and another of said elements for driving said element upon operation of said operating means, means for disconnecting the first intermediate means from said certain one engaging element, and means for determining which totalizer shall cooperate with the connected engaging element.

9. In a machine of the class described, the combination of a plurality of totalizers, actuating means common to all totalizers and adapted to be moved in one direction to accumulate upon the totalizers, and in another direction to restore the totalizers to zero, a plurality of totalizer engaging elements one of which engages a totalizer with the actuating means prior to the acculating movement thereof, and another of which engages a totalizer with the actuating means prior to the restoring movement thereof, common operating means for said engaging elements, means intermediate the common operating means and said one element for driving said element upon operation of the operation means, means intermediate the common operating means and another of said elements for driving said element upon operation of said operating means, means for determining which totalizer shall cooperate with said one element, means for determining which totalizer shall cooperate with another of said elements, and means controlled by the second determining means for rendering the first intermediate means ineffective.

10. In a machine of the class described, the combination of a plurality of groups of totalizers, actuating means common to all totalizers of all groups adapted to be moved in one direction to accumulate upon the totalizers, and in another direction to restore the totalizers to zero, means common to all totalizers for engaging any totalizer of one group with the actuating, means prior to the travel of said actuating means in one direction, means common to all totalizers for engaging any totalizer of another group with the actuating means prior to the travel of said actuating means in the other direction, a common operating device for both of said engaging means, and means for selecting the desired totalizers.

11. In a machine of the class described, the combination of a plurality of groups of totalizers, actuating means common to all totalizers of all groups adapted to be moved in one direction to accumulate upon the totalizers, and in another direction to restore the totalizers to zero, means common to all totalizers for engaging any totalizer of one group with the actuating means prior to the travel of said actuating means in one direction, means common to all totalizers for engaging any totalizer of another group with the actuating means prior to the travel of said actuating means in the other direction, a common operating device for both of said engaging means, means for selecting the desired totalizers, and a differentially adjustable element and a plurality of keys for controlling said selecting means 12. In a machine of the class described, the combination of a plurality of groups of totalizers, actuating means common to all totalizers of all groups adapted to be moved in one direction to accumulate upon the totalizers, and in another direction to restore the totalizers to zero, means common to all totalizers for engaging any totalizer of one group with the actuating means prior to the travel of said actuating means in one direction, means common to all totalizers for engaging any totalizer of another group with the actuating means prior to the travel of said actuating means in the other direction, a common operating device for both of said engaging means, means intermediate said device and the first engaging means for actuating said engaging means upon operation of said device, means intermediate said device and the second engaging means for actuating said engaging means upon operation of said device, means for selecting the desired totalizers, a differentially adjustable element and a plurality of means for controlling said selecting means, and means controlled by said differentially adjustable element for rendering the first intermediate means ineffective.

13. In a machine of the class described, the combination of a plurality of groups of totalizers, actuating means common to all totalizers of all groups adapted to be moved in one direction to accumulate upon the totalizers, and in another direction to restore the totalizers to zero, means common to all totalizers for engaging any totalizer of one group with the actuating means prior to the travel of said actuating means in one direction, means common to all totalizers for engaging any totalizer of another group with the actuating means prior to the travel of said actuating means in the other direction, a common operating device for both of said engaging means, means intermediate said device and the first engaging means for actuating said engaging means upon operation of said device, means intermediate said device and the second engaging means for actuating said engaging means upon the operation of said device, means for selecting the desired totalizers, a differentially adjustable element and a plurality of keys for controlling said selecting means, and an element connected to the first intermediate means and the differentially adjustable element, and operated by the latter to disconnect said first intermediate means from said first engaging means.

14. In a machine of the class described, the combination of a plurality of groups of totalizers, actuating means common to all totalizers of all groups adapted to be moved in one direction to accumulate upon the totalizers, and in another direction to restore the totalizers to zero, means common to all totalizers for engaging any totalizer of one group with the actuating means prior to the travel of said actuating means in one direction, means common to all totalizers for engaging any totalizer of another group with the actuating means prior to the travel of said actuating means in the other direction, a common operating device for both of said engaging means, means intermediate said device and the first engaging means for actuating said engaging means upon operation of said device, means intermediate said device and the second engaging means for actuating said engaging means upon operation of said device, means for selecting the desired totalizers, an element adapted to be moved into any one of a plurality of positions to select the group containing the totalizer to be operated when the actuating means is moving in one direction, a plurality of keys, certain of which controls the selecting means to select a totalizer from the selected group and certain others of which control the selecting means to select a totalizer from another group, and an element connected to the first intermediate means and said first-mentioned element and operated when the latter is moved to a certain of said positions to disconnect said first intermediate means from said first engaging means.

15. In a machine of the class described, the combination of a plurality of groups of totalizers, and means including keys for transferring a total from any totalizer of any group to any totalizer of any other group.

16. In a machine of the class described, the combination of a plurality of groups of totalizers, and means including keys for transferring a total from a totalizer of any group to a totalizer in each of a plurality of other groups.

17. In a machine of the class described, the combination of a plurality of groups of totalizers, and means including keys for transferring a total from any totalizer of one group to a totalizer in each of one or more other groups.

18. In a machine of the class described, the combination of a plurality of groups of totalizers, means for transferring the total from a totalizer of any group to a totalizer in each of a plurality of other groups, and means common to all groups for selecting said any group.

19. In a machine of the class described, the combination of a plurality of groups of totalizers, means for transferring the total from a totalizer of any group to a totalizer in each of a plurality of other groups, a differentially adjustable element for selecting said any group, and a plurality of keys operating in conjunction with said element for selecting the totalizers of the other groups.

20. In a machine of the class described, the combination of a plurality of groups of totalizers, means for transferring the total from any totalizers of one group to any totalizer of another group, and means for recording the amount transferred and for designating both totalizers.

21. In a machine of the class described, the combination of a plurality of groups of totalizers, means for transferring the total from a totalizer of any group to a totalizer in each of a plurality of other groups, and means for recording the amount transferred and for designating the totalizers.

22. In a machine of the class described, the combination of a plurality of groups of totalizers, means for transferring the total from any totalizer of one group to any totalizer of another group and means for designating the totalizers during one operation of the machine.

23. In a machine of the class described, the combination of a plurality of totalizers arranged in groups, a plurality of group totalizers, actuating means common to all totalizers, amount determining devices for controlling the actuating means, means for controlling the totalizers so that the amounts added into the individual totalizers of one group are added into one group totalizer and the amounts added into the individual totalizers of two other groups are added into another group totalizer, and means for transferring the amounts from the first group totalizer to the second group totalizer.

24. In a machine of the class described, the combination of a plurality of totalizers arranged in groups, a plurality of group totalizers, actuating means common to all totalizers, manipulative amount determining devices for controlling the actuating means, means for controlling the totalizers so that the amounts added into the individual totalizers of one group are added into one group totalizers and the amounts added into the individual totalizers of two other groups are added into another group totalizer, and means for causing said actuating means to turn the first group totalizer to zero, and simultaneously add the amounts cleared from said group totalizer into the second group totalizer.

25. In a machine of the class described, the combination of a plurality of totalizers arranged in groups, a plurality of group totalizers, and means for transferring the total from a totalizer in one of the groups to a totalizer in another of the groups, and simultaneouly transferring said total to one of the group totalizers.

26. In a machine of the class described, the combination of a plurality of totalizers, actuators common to all totalizers, a supporting frame for each totalizer, connections attached to each frame, means common to all of said connections for operating any one of them at a certain time to engage a totalizer with the actuators, additional means common to all of said connections for operating a plurality of said connections at a certain time to engage a totalizer with the actuators, and means for determining which connections shall be operated by the two means.

27. In a machine of the class described, the combination of a plurality of totalizers, actuators common to all totalizers, a supporting frame for each totalizer connections attached to each frame, means common to all of said connections for operating any one of them at a certain time to engage a totalizer with the actuators, additional means common to all of said connections for operating any one of them at a certain time to engage a totalizer with the actuation, means for determining which connections shall be operated by the first means, and means for determining which of the remaining connections shall be operated by the latter means.

28. In a machine of the class described, the combination of a plurality of totalizers, actuators common to all totalizers, a supporting frame for each totalizer connections attached to each frame, a totalizer engaging member having a plurality of openings adapted to cooperate with said connections to engage totalizers with the actuators, an additional totalizer engaging member having a plurality of projecting forks adapted to cooperate with said connections to engage totalizers with the actuators, means for moving one of said connections into engagement with one of said openings, means for moving another of said connections into engagement with one of said forks, and a common operating means for both of said members.

29. In a machine of the class described, the combination of a plurality of totalizers, actuators common to all totalizers, a supporting frame for each totalizer, connections attached to each frame, a totalizer engaging member having a plurality of openings adapted to cooperate with said connections to engage totalizers with the actuators, an additional totalizer engaging member having a plurality of forks adapted to cooperate with said connections to engage totalizers with the actuators, and a plurality of devices, one for each of said connections normally engaging the same for moving said connections into engagement with said openings and with said forks as desired.

30. In a machine of the class described, the combination of a plurality of groups of totalizers, actuators common to all totalizers of all groups, a supporting frame for each group, connections attached to each frame, a totalizer engaging member having a plurality of openings adapted to cooperate with said connections to engage totalizers with the actuators, an additional totalizer engaging member having a plurality of forks adapted to cooperate with said connections to engage totalizers with the actuators, means for moving one of said connections into engagement with one of said openings, means for moving another of said connections into engagement with one of said forks, a common operating means for both of said totalizer engaging members, and means intermediate said common operating means and said members for controlling said members so that a totalizer of one group is engaged with the actuators and then disengaged simultaneously with the engagement of a second totalizer from another group whereby the amount is transferred from the totalizer first engaged to said second totalizer.

31. In a machine of the class described, the combination of a plurality of totalizers, actuators common to all totalizers, a supporting frame for each totalizer, connections attached to each frame, means common to all of said connections for operating any one of them at a certain time to engage its associated totalizer with the actuators, an additional means common to all of said connections for operating any one of them at a certain time to engage its associated totalizer with the actuators, and means for determining whether one or both of said means shall operate said connections.

32. In a machine of the class described, the combination of a plurality of totalizers, actuators common to all totalizers, a supporting frame for each totalizer, connections attached to each frame, a member having a plurality of openings adapted to cooperate with said connections to engage totalizers with the actuators, an additional member having a plurality of forks adapted to cooperate with said connections to engage totalizers with the actuators, a stationary member having openings with large and small sections cooperating with said connections, means for moving one of said connections into engagement with one of said openings in the first member, means for moving another of said connections into engagement with one of said forks and means for moving a third one of said connections into engagement with the small section of an opening in the stationary plate, thereby locking its associated totalizer against movement.

33. In a machine of the class described, the combination of a plurality of totalizers, actuators common to all totalizers, a supporting frame for each totalizer, connections attached to each frame, a member having a plurality of openings adapted to cooperate with said connections to engage the totalizers with the actuators, an additional member having a plurality of forks adapted to cooperate with said connections to engage the totalizers with the actuators, said forks being in alignment with said openings, and a common operating means for both of said members.

34. In a machine of the class described, the combination of a plurality of totalizers, actuators common to all totalizers, a supporting frame for each totalizer, connections attached to each frame, a member having a plurality of openings adapted to cooperate with said connections to engage the totalizers with the actuators, an additional member having a plurality of projecting forks adapted to cooperate with said connections to engage the totalizers with the actuators, said forks being in alignment with said openings, means for causing certain of said connections to engage certain of said openings and certain others of said connections to engage certain of said forks, and a device common to both of said members for operating them to cause the totalizers to be engaged with the actuators at certain times, whereby the total is taken from one of the totalizers and transferred to the remaining totalizers.

35. In a machine of the class described, the combination of a plurality of totalizers, actuators common to all totalizers, a supporting frame for each group, connections attached to each frame, an oscillating member having a plurality of openings adapted to cooperate with said connections to engage the totalizers with the actuators, an additional oscillating member having a plurality of projecting forks adapted to cooperate with said connections to engage the totalizers with the actuators, said forks being in alignment with said openings, a stationary plate having openings with large and small sections cooperating with said connections, means for moving one of said connections into engagement with one of said openings in the oscillating member, means for moving another of said connections into engagement with one of said hooks, means for moving a third of said connections into engagement with the small portion of an opening in the stationary member, and a plurality of differentially adjustable members for controlling all three of said moving means.

36. In a machine of the class described, the combination of a plurality of totalizers, actuators common to all totalizers, a supporting frame for each totalizer, connections attached to each frame, a member having a plurality of openings adapted to cooperate with said connections to engage the totalizers with the actuators, an additional member having a plurality of projecting forks adapted to cooperate with said connections to engage the totalizers with the actuators, means for moving one of said connections into engagement with one of said openings, means for moving a plurality of other connections into engagement with a plurality of said forks, and a device common to both of said members for operating them to cause the totalizer having its connection engaged with the opening to be moved into engagement with the actuators so that it will be reset to zero and for causing the totalizers whose connections are engaged by said forks to be engaged with the actuators at such a time that the amount which is cleared from the first totalizer, will be transferred to both of said totalizers.

37. In a machine of the class described, the combination of a plurality of totalizers, actuators common thereto, a supporting frame for each totalizer, connections attached to each frame for moving the totalizers into engagement with the actuators, a member common to all connections for operating any one of them, another member common to all of said connections for operating any one or more of said connections, means for moving one of said connections into engagement with the first member, means for moving one or more of said connections into engagement with the second member, common operating means for both of said members, and means for disconnecting the second member from the common operating means.

38. In a machine of the class described, the combination of a plurality of totalizers, actuating means common thereto, a support for each totalizer, connections attached to each support for moving the totalizers into engagement with the actuators, a member common to all of said connections for operating any one of them, an additional member common to all of said connections for operating any one or more of them, common operating means for both members, and means intermediate said common operating means and said members, whereby the timing of engagement of the totalizers with the actuators is controlled so that the amount is transferred from one totalizer to one or more of the other totalizers depending upon whether one or more of the connections are being operated by the second member.

39. In a machine of the class described, the combination of a plurality of totalizers, actuators common thereto, a support for each totalizer, connections attached to each support for moving the totalizers into engagement with the actuators, means common to all of said connections for operating any one of them, an additional means common to all of said connections for operating any one of them, a common operating device for both of said means, and adjustable connections intermediate said common operating device and both of said means for so controlling the movements of both of said means that the totalizers are engaged with the actuators at such times that an amount is taken from one totalizer and transferred to another totalizer.

40. In a machine of the class described, the combination of a plurality of totalizers, actuators common thereto, a support for each totalizer, connections attached to each support for moving the totalizers into engagement with the actuators, an oscillating member common to all of said connections for operating one of said connections to engage its associated totalizer with the actuators so that said totalizer will be cleared, and an additional oscillating member common to all of said connections for operating another one of said connections so that its associated totalizer is engaged with the actuators at such a time that the amount which is cleared from the first totalizer is transferred to the latter totalizer.

41. In a machine of the class described, the combination of a plurality of groups of totalizers, actuators therefor, means for conditioning the machine to take a total or sub-total from any totalizer in any group, means controlled by the conditioning means for transferring the total during a total taking operation to another totalizer in another group, and means controlled by the conditioning means for preventing the total from being transferred to another totalizer during a sub-total taking operation.

42. In a machine of the class described, the combination of a plurality of groups of totalizers, actuators therefor, means for conditioning the machine to take a total or sub-total from any totalizer in any group, a member for engaging any totalizer in any group with the actuators during total taking and sub-total taking operations, another member for engaging another totalizer of another group during total taking operations to cause the total to be transferred from the first mentioned totalizer to the second mentioned totalizer, and means operated by the conditioning means for preventing the second member from operating during a sub-total taking operation.

43. In a machine of the class described, the combination of a plurality of groups of totalizers, means for selecting any totalizer in any group and restoring it to zero, means for automatically transferring the total from the totalizer which is reset to a certain totalizer of another group, and means for manually controlling the machine so that the total which is transferred will be entered into another totalizer on another group when desired.

44. In a machine of the class described, the combination of a plurality of group totalizers, means for transferring the total from one group totalizer to another group totalizer, means for printing characters designating said one group totalizer, means for printing characters designating the other group totalizer, and means for taking a sub-total from said one group totalizer and preventing the transfer of this total into another group totalizer, and also preventing the printing of the character representing the second group totalizer.

45. In a machine of the class described, the combination of a totalizer engaging plate having an offset fork, a second totalizer engaging plate having a notch in alignment with said fork, and means cooperating with said plates and adapted to have three positions of adjustment, one in engagement with the fork, one in engagement with the notch of the second engaging plate, and one disengaged from both the fork and the notch.

46. In a machine of the class described, the combination of a totalizer adding engaging plate having an offset fork, a totalizer resetting engaging plate having a notch registering with said fork, a stationary locking plate, a totalizer engaging member projecting through a notch in said stationary plate and adapted to cooperate with the fork and the notch, and also having a non-cooperative position with relation to the fork and notch, a zero resetting member engaging another opening in the stationary plate, a common operating member for the totalizer engaging member and the zero resetting member, whereby a movement of the engaging member into the fork or into the non-cooperative position, simultaneously positions the resetting member into the locking section of the slot in the stationary plate, and movement of the engaging member into the notch in the resetting plate, simultaneously positions the resetting member into another section of the slot in the stationary plate.

47. In a machine of the class described, the combination of a totalizer adding engaging plate having an offset fork, a totalizer resetting engaging plate having a notch in alignment with said fork, a stationary locking plate, a zero resetting member having a projection extending into an opening in the stationary plate, a totalizer engaging member having a projection extending into an opening in the stationary plate, and a common operating means for both of said members, whereby movement of the totalizer engaging projection into a position outside of the fork and notch moves the resetting projection into the locking section of its slot, and movement of the totalizer engaging projection into the fork, which permits a free movement of said projection, moves the resetting engaging projection into another locking section of its slot, and movement of the totalizer engaging projection into the notch moves the resetting projection into another section of its slot wherein it is free to move.

48. In a machine of the class described, the combination of a plurality of totalizers; actuators common to all totalizers; a supporting frame for each totalizer; connections for each frame to move the totalizers into engagement with the actuators; means common to all connections to operate any one of them at a certain time; additional means common to all connections to operate any one of them at a certain time; and means for determining whether one or both of said common means shall operate one or more of said connections.

49. In a machine of the class described, the combination of a totalizer; actuators therefor, to add into and to reset said totalizer; a totalizer supporting frame having a pendant link; means adapted to cooperate with said member to engage the totalizer with said actuators for adding; means adapted to cooperate with said member to engage the totalizer with the actuators for resetting; a normally flexed toggle adapted to be operated by the totalizer to control the actuators during resetting; means to straighten the toggle; a device cooperating with the pendant link and with the toggle straightening means, said device having a plurality of openings with sections to lock the link and toggle straightening means against movement, and sections to allow movement of said link and toggle straightening means; a single member having a plurality of positions of adjustment, and slots engaging said pendant link and the toggle straightening means to connect said link and said toggle straightening means with the totalizer resetting engaging means when said single member is in one of its positions of adjustment, and to connect said link with the totalizer adding engaging means and to move the toggle straightening means into the locking section in the opening in said device, when said single member is in another of its positions of adjustment.

50. In a machine of the class described, a plurality of totalizers, and means including keys for transferring a total from one totalizer to a plurality of totalizers simultaneously.

51. In a machine of the class described, the combination of a plurality of groups of totalizers, and mechanical means for transferring the total from any totalizer of any group to any totalizer of any other group.

52. In a machine of the class described, the combination of a plurality of groups of totalizers, and mechanical means for transferring the total from a totalizer of any group to a totalizer in each of a plurality of other groups.

53. In a machine of the class described, the combination of a plurality of groups of totalizers, and mechanical means for transferring the total from any totalizer of one group to a totalizer in each of one or more other groups.

54. In a machine of the class described, a plurality of totalizers, and mechanical means to transfer a total from one totalizer to a plurality of totalizers simultaneously.

BERNIS M. SHIPLEY.